(12) United States Patent
Schacht et al.

(10) Patent No.: US 12,311,320 B2
(45) Date of Patent: May 27, 2025

(54) USE OF EXTENDED SURFACTANTS IN PROCESS MEMBRANE CLEANING

(71) Applicant: ECOLAB USA INC., Saint Paul, MN (US)

(72) Inventors: Paul Frazer Schacht, Saint Paul, MN (US); Caleb Power, Saint Paul, MN (US); Keith G. LaScotte, Saint Paul, MN (US); Elizabeth Irey, Saint Paul, MN (US); Sukhwan Soontravanich, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 619 days.

(21) Appl. No.: 17/652,146

(22) Filed: Feb. 23, 2022

(65) Prior Publication Data

US 2022/0176324 A1   Jun. 9, 2022

Related U.S. Application Data

(62) Division of application No. 16/122,418, filed on Sep. 5, 2018, now Pat. No. 11,291,958.

(Continued)

(51) Int. Cl.
*B01D 65/02* (2006.01)
*A23C 9/14* (2006.01)
(Continued)

(52) U.S. Cl.
CPC .............. *B01D 65/025* (2013.01); *A23C 9/14* (2013.01); *B01D 65/02* (2013.01); *B01D 71/34* (2013.01);
(Continued)

(58) Field of Classification Search
None
See application file for complete search history.

(56) References Cited

U.S. PATENT DOCUMENTS 7,220,358 B2   5/2007   Schacht et al.
8,062,381 B2   11/2011   Shamayeli et al.
(Continued)

FOREIGN PATENT DOCUMENTS

JP   2015531669 A   11/2015
WO   0017303 A1   3/2000
(Continued)

OTHER PUBLICATIONS

Arend J. Kingma, Compatibility of nonionic surfactants with membrane materials and their cleaning performance, Food and Bioproducts Processing, vol. 93, 2015, pp. 304-309, ISSN 0960-3085, https://doi.org/10.1016/j.fbp.2014.10.002. (Year: 2015).*

(Continued)

*Primary Examiner* — Jason M Greene
*Assistant Examiner* — Eric J McCullough
(74) *Attorney, Agent, or Firm* — McKee, Voorhees & Sease, PLC

(57) ABSTRACT

Disclosed are membrane separation cleaning processes and clean in place compositions for such membranes. The cleaning compositions can remove proteins, fats, and other food, beverage, and brewery based soils and offer an environmentally friendly alternative surfactant system to NPE. Branched extended chain PO/EO nonionic surfactants with certain characteristics may be used to provide superior cleaning to membranes. The specific surfactants may be used alone or in combination. In some embodiments, the surfactant package is used as part of a cleaning composition.

11 Claims, 9 Drawing Sheets

Related U.S. Application Data

(60) Provisional application No. 62/565,361, filed on Sep. 29, 2017.

(51) Int. Cl.
 B01D 71/34 (2006.01)
 B01D 71/68 (2006.01)

(52) U.S. Cl.
 CPC .......... B01D 71/68 (2013.01); *A23C 2210/20* (2013.01); *B01D 2321/164* (2013.01); *B01D 2321/168* (2013.01)

(56) References Cited

U.S. PATENT DOCUMENTS

| | | |
|---|---|---|
| 8,246,696 B2 | 8/2012 | Man et al. |
| 8,278,259 B2 | 10/2012 | Shamayeli et al. |
| 8,314,057 B2 | 11/2012 | Christensen et al. |
| 8,454,709 B2 | 6/2013 | Man et al. |
| 8,580,727 B2 | 11/2013 | Man et al. |
| 8,697,622 B2 | 4/2014 | Man et al. |
| 2003/0015219 A1 | 1/2003 | Kravitz et al. |
| 2004/0140259 A1 | 7/2004 | Cummings |
| 2005/0126599 A1 | 6/2005 | Labib et al. |
| 2006/0089281 A1 | 4/2006 | Gibson |
| 2008/0031970 A1 | 2/2008 | Benedict et al. |
| 2008/0169006 A1 | 7/2008 | Musale et al. |
| 2008/0221006 A1 | 9/2008 | Heisig et al. |
| 2008/0264454 A1 | 10/2008 | Tabani et al. |
| 2010/0000579 A1 | 1/2010 | Reinbold et al. |
| 2011/0259367 A1 | 10/2011 | Ahmed et al. |
| 2011/0312865 A1 | 12/2011 | Hodge et al. |
| 2012/0289448 A1 | 11/2012 | Man et al. |
| 2014/0274857 A1* | 9/2014 | Schacht .................. C11D 1/75 510/234 |
| 2017/0037339 A1 | 2/2017 | Hilarides |

FOREIGN PATENT DOCUMENTS

| | | |
|---|---|---|
| WO | 2012134987 A1 | 10/2012 |
| WO | 2013164492 A1 | 11/2013 |
| WO | 2014164024 A1 | 10/2014 |

OTHER PUBLICATIONS

Brink, L.E.S. et al., "Reducing the Protein Fouling of Polysulfone Surfaces and Polysulfone Ultrafiltration Membranes: Optimization of the Type of Presorbed Layer", Desalination, 78, 209-233. 1990.

Fane, A.G. et al., "The Effect of Surfactant Pretreatment on the Ultrafiltration of Proteins" Desalination, 53, 37-55, 1985.

Luo, Jianquan et al., "Flux decline control in nanofiltration of detergent wastewater by a shear-enhanced filtration system" Chemical Engineering Journal 181-182 (2012) 397-406, 2012.

Samper, E. et al., "Removal of metal ions at low concentration by micellar-enhanced ultrafiltration (MEUF) using sodium dodecyl sulfate (SOS) and linear alkylbenzene sulfonate (LAS)", Separation and Purification Technology 65, 337-342, 2009.

Xiarchos, Ioannis et al., "Interaction behavior in ultrafiltration of nonionic surfactant micelles by adsorption", Journal of Colloid and Interface Science 299, 102-111, 2006.

Ecolab USA Inc., "The International Search Report and Written Opinion of The International Searching Authority" Issued in connection with PCT/US2014/019971 filed Mar. 3, 2014, mailed Jun. 26, 2014.

Ecolab USA Inc., "Notification of Transmittal of the International Search Report and The Written Opinion of the International Searching Authority, or the Declaration" in connection with PCTUS2018/049577, mailed May 9, 2019.

Fujimoto, "Section II. Chemical Structure of Surfactants", Sanyo Chemical Industries, Ltd. pp. 98-99, Aug. 1992.

* cited by examiner

USE OF EXTENDED SURFACTANTS IN PROCESS MEMBRANE CLEANING

CROSS-REFERENCE TO RELATED APPLICATIONS

This application is a Divisional Application of U.S. Ser. No. 16/122,418, filed Sep. 5, 2018, which application claims priority to provisional application U.S. Ser. No. 62/565,361 filed Sep. 29, 2017, which are incorporated herein by reference in their entirety.

FIELD OF THE INVENTION

Described herein are methods and compositions for cleaning membranes used in separation facilities. The cleaning compositions can remove proteins and fats and offer an environmentally friendly alternative surfactant system to nonyl phenol ethoxylate (NPE). The application includes a surfactant additive or booster system that can form part of a cleaning composition or can be used alone for improving the cleaning properties of cleaning solutions as well as improve the performance of the membrane by cleaning the surface and minimizing subsequent protein or soil fouling during the following processing run.

BACKGROUND OF THE INVENTION

Membranes provided within a separation facility can be treated using clean-in-place (CIP) methods to provide flushing, rinsing, pretreatment, cleaning, sanitizing and preserving, as filtration membranes have a tendency to foul during processing. Fouling manifests itself as a decline in flux with time of operation. Flux decline is typically a reduction in permeation flow or permeation rates that occurs when all operating parameters, such as pressure, feed flow rate, temperature, and feed concentration are kept constant. In general, membrane fouling is a complicated process and is believed to occur due to a number of factors including electrostatic attraction, hydrophobic and hydrophilic interactions, the deposition and accumulation of feed components, e.g., suspended particulates, impermeable dissolved solutes, and even normally permeable solutes, on the membrane surface and/or within the pores of the membrane. It is expected that almost all feed components will foul membranes to a certain extent. See Munir Cheryan, Ultrafiltration and Microfiltration Handbook, Technical Publication, Lancaster, Pa., 1998 (Pages 237-288). Fouling components and deposits can include inorganic salts, particulates, microbials and organics.

Filtration membranes typically require periodic cleaning to allow for successful industrial application within separation facilities such as those found in the food, dairy, and beverage industries. The filtration membranes can be cleaned by removing foreign material from the surface and body of the membrane and associated equipment. The cleaning procedure for filtration membranes can involve a clean-in-place CIP process where cleaning agents are circulated over the membrane to wet, penetrate, dissolve and/or rinse away foreign materials from the membrane. Various parameters that can be manipulated for cleaning typically include time, temperature, mechanical energy, chemical composition, chemical concentration, soil type, water type, hydraulic design, and membrane materials of construction.

Chemical energy in the form of detergents and cleaners can be used to solubilize or disperse the foulant or soil. Thermal energy in the form of heat can be used to help the action of the chemical cleaners. In general, the greater the temperature of the cleaning the solution, the more effective it is as a cleaning treatment, although most membrane materials have temperature limitations due to the material of construction. Many membranes additionally have chemical limitations. Mechanical energy in the form of high velocity flow also contributes to the successful cleaning of membrane systems. See Munir Cheryan, Ultrafiltration and Microfiltration Handbook, Technical Publication, Lancaster, Pa., 1998, pages 237-288.

In general, the frequency of cleaning and type of chemical treatment performed on the membrane has been found to affect the operating life of a membrane. It is believed that the operating life of a membrane can be decreased as a result of chemical degradation of the membrane over time. Various membranes are provided having temperature, pH, and chemical restrictions to minimize degradation of the membrane material. For example, many polyamide reverse osmosis membranes have chlorine restrictions because chlorine can have a tendency to oxidatively attack and damage the membrane. Cleaning and sanitizing filtration membranes is desirable in order to comply with laws and regulations that may require cleaning in certain applications (e.g., the food and biotechnology industries), reduce microorganisms to prevent contamination of the product streams, and optimize the process by restoring flux. See Munir Cheryan, Ultrafiltration and Microfiltration Handbook, Technical Publication, Lancaster, Pa., 1998, pages 237-288.

Other exemplary techniques for cleaning filtration membranes are disclosed by U.S. Pat. No. 4,740,308 to Fremont et al.; U.S. Pat. No. 6,387,189 to Groschl et al.; U.S. Pat. No. 6,071,356 to Olsen; and Munir Cheryan, Ultrafiltration and Microfiltration Handbook, Technical Publication, Lancaster, Pa., 1998 (Pages 237-239).

It is believed that membrane performance declines during processing of milk, whey, and other feed streams due to the fouling of the membrane surface or membrane pores by protein, fat, minerals, and other feed stream components.

The fouling of membranes processing high solid feed streams therefore require that they are cleaned regularly using a clean-in-place (CIP) approach in which the use of alkaline, acid, and cleaning adjuvants such as surfactants and water conditioning polymers aid in the cleaning of the foulants and restore the membrane for functional use.

The proper use of alkaline, acid, and adjuvants requires an understanding of the functionality of the chemistry used. As an example, too high in pH or too low in pH can damage the polymeric membrane material. The use of solvents or overuse of surfactants can often time lead to destruction of the glue line causing the membrane to delaminate rendering it non-functional. Overusing oxidative chemicals such as sodium hypochlorite (chlorine bleach) or hydrogen peroxide can irreversibly damage some polymeric membrane types.

Conventional cleaning compositions used in CIP protocols, particularly those intended for institutional use, often contain alkyl phenol ethoxylates (APEs). APEs are used in cleaning compositions as a cleanser and a degreaser for their effectiveness at removing a variety of soils from a variety of surfaces. Commonly used APEs include nonyl phenol ethoxylates (NPE) surfactants such as NPE 9.5 or nonoxynol-9 which is a 9.5 mole ethoxylate of nonyl phenol.

However, while effective, APEs are disfavored due to environmental concerns. For example, NPEs are formed through the combination of ethylene oxide with nonylphenol (NP). Both NP and NPEs exhibit estrogen-like properties and may contaminate water, vegetation and marine life. NPE is also not readily biodegradable and remains in the environment or food chain for indefinite time periods. There is therefore a need in the art for an environmentally friendly and biodegradable alternative that can replace APEs in membrane cleaners which allow membranes to be adequately cleaned from soils, do not cause damage to the membranes or membrane construction materials, and do not foul the membranes themselves.

SUMMARY OF THE INVENTION

Disclosed herein are embodiments in the field of clean in place and other membrane cleaning protocols for cleaning membranes at separation facilities. More specifically, the disclosure relates to a surfactant system that for use in the same that offers an environmentally safer alternative surfactant system than NPE which is currently used in many operations.

Disclosed herein is a surfactant system as well as alkaline cleaning compositions incorporating the same and methods of use of the same. In one embodiment, a surfactant system is disclosed for use alone or in cleaning compositions. Applicants have identified characteristics and certain extended nonionic surfactants for use in cleaning membranes. Disclosed herein is the use of one or more extended, nonionic surfactants for membrane cleaning processes, also disclosed are synergistic combinations of the same. In a preferred embodiment, the surfactant is a branched extended chain propoxylated/ethoxylated surfactant. Additional characteristics of such surfactants are also disclosed. The surfactant in an embodiment has a cloud point of 50° C. or higher. Additional characteristics include a contact angle of below 20°, on a polysulfone substrate and a low interfacial tension. Applicants have determined several surfactants and polymers, one or more of which may be used successfully in membrane cleaning protocols. In some embodiments the surfactant is a Guerbet alcohol.

Extended nonionic surfactants include those of the general formula:

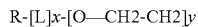

Where R is the lipophilic moiety, preferably branched, saturated or unsaturated, substituted or unsubstituted, aliphatic or aromatic hydrocarbon radical having from about 8 to 20 carbon atoms, L is a linking group, block of polyalkylene oxide, such as a block of poly-propylene oxide; x is the chain length of the linking group ranging from 5-25; and y is the average degree of ethoxylation ranging from 1-20, preferably 6-10. Applicant has found that when L is PO the superior extension length is between 5 and 8 moles of PO. Additional embodiments include combinations of extended chain nonionic surfactants be used in combination with the preferred surfactants. In some embodiments the surfactant has an R group of 2 ethyl,hexyl.

Another embodiment includes a cleaning composition comprising a source of alkalinity and the surfactant and/or polymer system. The source of alkalinity is such that it comprises approximately 500 ppm to 10,000 ppm actives in a use solution. The surfactant system comprises from about 0.05 weight percent to about 1.0 weight percent of actives in the cleaning solution. Additional functional ingredients such as chelants, preservatives, hydrotropes and the like may also be present. The surfactant system may be used as a part of a cleaning composition, may be used as a booster composition in combination with standard cleaning compositions, or may be used alone as part of an overall CIP process.

Another embodiment, is a method of removing soils, solutes and proteins from filtration membranes in a cleaning process. The method includes steps of applying to a membrane the cleaning composition disclosed herein, in some embodiments the method includes removing liquid product from the filtration system, contacting the membrane with an alkaline cleaning composition, or surfactant system. In some embodiments the method includes missing water with one of the surfactants disclosed and thereafter, flushing the membrane with water and the surfactants disclosed herein. This is typically achieved by circulating through the filtration system with an aqueous cleaning use solution and thereafter rinsing the filtration system.

The membranes that can be treated include any membranes that are designed for periodic cleaning, and are often utilized in various applications requiring separation by filtration. Exemplary industries that utilize membranes that can be treated include the food industry, the beverage industry, the biotechnology industry, the pharmaceutical industry, the chemical industry, and the water purification industry. In the case of the food and beverage industries, products including milk, whey, fruit juice, beer, and wine are often processed through a membrane for separation. The water purification industry often relies upon membranes for desalination, contaminant removal, and waste water treatment. An exemplary use of membranes in the chemical industry includes electropaint processes. The methods are particularly useful in removing proteins, fats, and minerals, such as those from whey in a milk or cheese making process. In an embodiment the membrane is a polyethersulfone membrane, or a polyvinylidene fluoride membrane While multiple embodiments are disclosed, still other will become apparent to those skilled in the art from the following detailed description, which shows and describes illustrative embodiments. Accordingly, the drawings and detailed description are to be regarded as illustrative in nature and not restrictive.

DETAILED DESCRIPTION OF THE INVENTION

Figure 1:
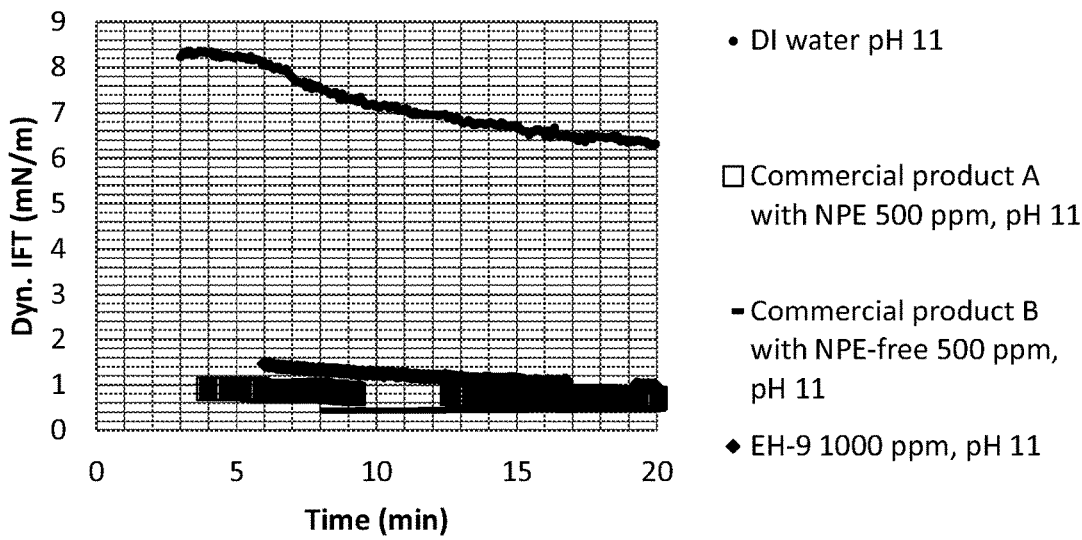
FIG. 1 is a graph of dynamic Interfacial Tension (IFT) measured at 50° C., 400 rpm against peanut oil.

Other than in the operating examples, or where otherwise indicated, all numbers expressing quantities of ingredients or reaction conditions used herein are to be understood as being modified in all instances by the term "about".

As used herein, weight percent (wt-%), percent by weight, % by weight, and the like are synonyms that refer to the concentration of a substance as the weight of that substance divided by the total weight of the composition and multiplied by 100.

As used herein, the term "about" modifying the quantity of an ingredient in the compositions disclosed or employed in the methods disclosed refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

The term "alkyl" or "alkyl groups," as used herein, refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups. In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

The term "surfactant" or "surface active agent" refers to an organic chemical that when added to a liquid changes the properties of that liquid at a surface.

"Cleaning" means to perform or aid in soil removal, bleaching, microbial population reduction, rinsing, or combination thereof.

As used herein, the term "substantially free" refers to compositions completely lacking the component or having such a small amount of the component that the component does not affect the effectiveness of the composition. The component may be present as an impurity or as a contaminant and shall be less than 0.5 wt. %. In another embodiment, the amount of the component is less than 0.1 wt-% and in yet another embodiment, the amount of component is less than 0.01 wt. %.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the terms "alkyl phenol ethoxylate-free" or "NPE-free" refers to a composition, mixture, or ingredients that do not contain alkyl phenol ethoxylates or phenol-containing compounds or to which the same has not been added. Should alkyl phenol ethoxylates or -alkyl phenol ethoxylate containing compound be present through contamination of a composition, mixture, or ingredients, the amount of the same shall be less than 0.5 wt. %. In another embodiment, the amount of is less than 0.1 wt-% and in yet another embodiment, the amount is less than 0.01 wt. %.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both, when using the substitute cleaning product or substitute cleaning system rather than a alkyl phenol ethoxylate-containing cleaning to address a typical soiling condition on a typical substrate. This degree of cleanliness may, depending on the particular cleaning product and particular substrate, correspond to a general absence of visible soils, or to some lesser degree of cleanliness, as explained in the prior paragraph.

The recitation of numerical ranges by endpoints includes all numbers subsumed within that range (e.g., 1 to 5 includes 1, 1.5, 2, 2.75, 3, 3.80, 4, and 5).

The terms "include" and "including" when used in reference to a list of materials refer to but are not limited to the materials so listed.

Surfactant/Polymer System

The disclosure includes a surfactant system which can be used as a booster or as part of an alkaline or acid cleaning composition and methods of use of the same. The surfactants can be used as a membrane cleaning adjuvant for improved removal of proteins, fat, and other soils from membranes and in some cases improving the hydrophilicity properties of membranes and improve processing permeation properties. Other considerations for a successful surfactant system include good rinsing characteristics, low foaming, good soil removal or cleaning properties, biodegradability, and relatively low cost. The use of a membrane incompatible surfactant can cause fouling issues on membrane surfaces. For example, the use of cationic surfactants are often associated with irreversible fouling of the membrane due to the inability to rinse or wash the surfactant from the surface. It is understood that the membrane has a negative surface charge and therefore a cationic surfactant is strongly attracted to the surface and cannot be easily removed. This residual surfactant on the surface acts as a foulant causing low production and water flux rates resulting in poor production performance.

Other surfactants such as anionic surfactants (DDBSA) are not attracted to the surface due to both the membrane and surfactant being negatively charged. This is believed to improve the rinseability of the surfactant while allowing it to assist in the aid of cleaning fats and proteins due to its reduction in surface tension.

Nonionic surfactants have been sparingly used as membrane cleaning adjuvants. They typically have positive properties such as degreasing, low foaming, wetting, and reducing surface tension. However, many of the nonionic surfactants can also cause fouling problems to the membrane due to their general poor rinseability characteristics. As the nonionics are technically neutral molecules, the predictability of whether or not they will perform well as a surfactant booster on a particular membrane type is less certain Molecular weight, hydrophilic-lipophilic-balance (HLB), alcohol chain length, Draves wetting, and degree of ethoxylation alone do not adequately predict whether or not a nonionic surfactant or polymer will function well on a membrane. Applicants have discovered that when using extended chain nonionic surfactants several important characteristics, do exist and should be considered. For example, contact angle as a predictor of wettability is important, and it is preferred that the contact angle be less than degrees on the membrane substrate. Also important is branching, in that at least some branching tends to improve cleaning characteristics. A low surfactant interfacial tension is perhaps the most important predictor as well as a cloud point that is near or higher than the cleaning temperature (typically 50° C. or higher).

In addition, the membrane surface type such as polyethersulfone (PES), polyvinyldenedifluoride (PVDF) have different surface energies that also affect how a surfactant functions on the surface and how the foulant functions on the surface. The molecular weight cut-off or pore size of a particular membrane will also likely affect the functionality of a surfactant due to pore fouling, pore penetration for cleaning pores, membrane permeation exclusion due to branching and molecular weight, and ease of permeation due to linearity.

One embodiment includes a surfactant component for use in the cleaning compositions and methods. The surfactant and polymer component is preferably a nonionic extended chain PO/EO surfactant.

Surfactants/Polymers

In certain embodiments, the surfactant includes one or more nonionic surfactants generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water-soluble compound having the desired degree of balance between hydrophilic and hydrophobic properties. Disclosed herein is the use of one or more extended, nonionic surfactants for membrane cleaning processes. In a preferred embodiment, the surfactant is an extended chain branched ethoxylated/propoxylated alcohol. The surfactant in an embodiment has a cloud point of 50° or higher. Additional characteristics include a contact angle of below 20, and a low interfacial tension. Applicants have determined several surfactants and polymers, one or more of which may be used successfully in membrane cleaning protocols. Extended nonionic surfactants include those of the general formula:

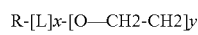

R-[L]x-[O—CH2-CH2]y

Where R is the lipophilic moiety, preferably branched, saturated or unsaturated, substituted or unsubstituted, aliphatic or aromatic hydrocarbon radical having from about 8 to 20 carbon atoms, L is a linking group, block of polyalkylene oxide, such as a block of poly-propylene oxide, a block of poly-ethylene oxide, a block of poly-butylene oxide or a mixture thereof; x is the chain length of the linking group ranging from 5-25; and y is the average degree of ethoxylation ranging from 1-20. Applicant has found that when L is PO the superior extension length is between 5 and 8 moles of PO.

Another embodiment is to provide a cleaning composition comprising a source of alkalinity and the surfactant system. The source of alkalinity is such that it comprises approximately 500 ppm to 10,000 ppm actives in a use solution. The surfactant system comprises from about 0.05 weight percent to about 1.0 weight percent of actives in the cleaning solution. Additional functional ingredients such as chelants, preservatives, hydrotropes and the like may also be present. The surfactant system may be used as a part of a cleaning composition, may be used as a booster composition in combination with standard cleaning compositions, or may be used alone as part of an overall CIP process.

Preferred extended surfactants include: branched Guerbet alcohol alkoxylates; such as $C_{10}(PO)_8(EO)_x$ (x=3, 6, 8, 10) also, extended linear alcohol alkoxylates; $C_{(12-14)}(PO)_{16}(EO)_x$ (x=6, 12, 17).

Branched Alcohol Alkoxylates

Preferred branched alcohol alkoxylates include Guerbet ethoxylates. Guerbet ethoxylates suitable have the following formula

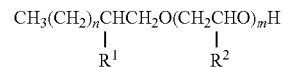

$$CH_3(CH_2)_n\underset{R^1}{C}HCH_2O(CH_2\underset{R^2}{C}HO)_mH$$

The Guerbet ethoxylate may be further defined wherein R1 is C2-C20 alkyl and R2 is H or C1-C4 alkyl. In a further aspect, the Guerbet ethoxylate is defined wherein "n" is an integer between 2 and 20 and wherein "m" is an integer between 1 and 40.

In a preferred aspect, the branched alcohol alkoxylate is a Guerbet ethoxylate that is prepared from a Guerbet alcohol by dimerization of alkenes (e.g. butane).

The branched alcohol alkoxylates, including Guerbet ethoxylates, can be prepared according to U.S. Pat. Nos. 6,906,320, 6,737,553 and 5,977,048, the disclosure of these patents are herein incorporated by reference in their entirety. Exemplary branched alcohol alkoxylates include those available under the tradenames Lutensol XP-30 and Lutensol XP-50 (BASF Corporation). In general, Lutensol XP-30 can be considered to have 3 repeating ethoxy groups, and Lutensol XP-50 can be considered to have 5 repeating ethoxy groups.

Branched alcohol alkoxylates can be classified as relatively water insoluble or relatively water soluble. In general, a water insoluble branched alcohol alkoxylate can be considered an alkoxylate that, when provided as a composition containing 5 wt.-% of the branched alcohol alkoxylate and 95 wt.-% water, has a tendency to phase separate. Lutensol XP-30 and Lutensol XP-50 from BASF Corporation are examples of water-insoluble branched alcohol alkoxylates.

According to an embodiment a branched alcohol alkoxylate, preferably a water-insoluble Guerbet ethoxylate has from about 10 wt.-% to about 90 wt.-% ethylene oxide, from about 20 wt.-% to about 70 wt.-% ethylene oxide preferably from about 30 wt.-% to about 60 wt.-% ethylene oxide. In a preferred embodiment these surfactants may be used in combination with other surfactants, such as the Ethyl hexyl (PO)5(EO)y extended surfactants.

Additional extended surfactants include capped extended nonionic surfactants which lower the foam profile of the composition and foam from protein soil.

Capped extended nonionic surfactants can include:

$$R{-}[PO]_x{-}[EO]_y{-}[N]_z$$

Where N is a capping group such as an alkyl group such as methyl, benzyl, butyl, etc.; a PO group of from 1-5 length, in length. These capped nonionic surfactants have lowered foam profiles and the like are effective for rinse aid formulations and detergents.

Many extended chain anionic and nonionic surfactants are commercially available from a number of sources. Table 1 is a representative, nonlimiting listing of several examples of the same.

TABLE 1

| Extended Surfactants | Source | % Active | Structure |
|---|---|---|---|
| Plurafac SL-42 (nonionic) | BASF | 100 | C6-10-(PO)3(EO)6 |
| Plurafac SL-62 (nonionic) | BASF | 100 | C6-10-(PO)3(EO)8 |
| Lutensol XP-40 (nonionic) | BASF | 100 | (3 propyl heptanol Guerbet alcohol series) C10-(PO)a(EO)b series, where a is 1.0 to 1.5, and b is 4 to 14. |
| Lutensol XP-50 (nonionic) | BASF | 100 | |
| Lutensol XP-60 (nonionic) | BASF | 100 | |
| Lutensol XP-69 (nonionic) | BASF | 100 | |
| Lutensol XP-70 (nonionic) | BASF | 100 | |
| Lutensol XP-79 (nonionic) | BASF | 85 | |
| Lutensol XP-80 (nonionic) | BASF | 100 | |
| Lutensol XP-89 (nonionic) | BASF | 80 | |
| Lutensol XP-90 (nonionic) | BASF | 100 | |
| Lutensol XP-99 (nonionic) | BASF | 80 | |
| Lutensol XL-100 (nonionic) | BASF | 100 | |
| Lutensol XP-140 (nonionic) | BASF | 100 | |
| New Lutensol XL surfactant designed by Ecolab | BASF | 100 | C10 Guerbet alcohol (PO)8(EO)3 |
| New Lutensol XL surfactant designed by Ecolab | BASF | 100 | C10 Guerbet alcohol (PO)8(EO)6 |
| New Lutensol XL surfactant designed by Ecolab | BASF | 100 | C10 Guerbet alcohol (PO)8(EO)8 |
| New Lutensol XL surfactant designed by Ecolab | BASF | 100 | C10 Guerbet alcohol (PO)8(EO)10 |
| Ecosurf EH-3 (nonionic) | Dow | 100 | 2-Ethyl Hexyl $(PO)_5(EO)_{3, 6,\ or\ 9}$ series |
| Ecosurf EH-6 (nonionic) | Dow | 100 | |
| Ecosurf EH-9 (nonionic) | Dow | 100 | |
| Ecosurf SA-4 (nonionic) | Dow | 100 | C 6-12 (PO)3-4 (EO)4 |
| Ecosurf SA-7 (nonionic) | Dow | 100 | C 6-12 (PO)3-4 (EO)7 |
| Ecosurf SA-9 (nonionic) | Dow | 100 | C 6-12 (PO)3-4 (EO)9 |
| Surfonic PEA-25 (nonionic) | Huntsman | 100 | C12-14(PO)2N[(EO)2.5}2 |
| X-AES (anionic) | Huntsman | 23 | C12-14-(PO)16-(EO)2-sulfate |
| X-LAE6 (nonionic) | Huntsman | 100 | C 12-14-(PO)16(EO)6 |
| X-LAE12 (nonionic) | Huntsman | 100 | C 12-14-(PO)16(EO)12 |
| X-LAE17 (nonionic) | Huntsman | 100 | C 12-14-(PO)16(EO)17 |
| Alfoterra 123-4S (anionic) | Sasol | 30 | C 12-13-(PO)4-sulfate |
| Alfoterra 123-8S (anionic) | Sasol | 30 | C 12-13-(PO)8-sulfate |
| Marlowet 4561 (nonionic under acidic condition, anionic under alkaline condition) | Sasol | 90 | C16-18(PO)4(EO)5-carboxylic acid |
| Marlowet 4560 (nonionic under acidic condition, anionic under alkaline condition) | Sasol | 90 | C16-18(PO)4(EO)2-carboxylic acid |
| Marlowet 4539 (nonionic under acidic condition, anionic under alkaline condition) | Sasol | 90 | Iso C9-(PO)2EO2-carboxylic acid |
| LP-6818-41-IP2 | Exp | 100 | C 12-14-(PO)4 |
| LP-6818-41-IP3 | Exp | 100 | C 12-14-(PO)6 |
| LP-6818-41-IP4 | Exp | 100 | C 12-14-(PO)8 |
| LP-6818-47-IP5 | Exp | 100 | C 12-14-(PO)4(EO)12 |
| LP-6818-47-IP6 | Exp | 100 | C 12-14-(PO)4(EO)14 |
| LP-6818-47-IP7 | Exp | 100 | C 12-14-(PO)4(EO)16 |
| LP-6818-49-FB | Exp | 100 | C 12-14-(PO)4(EO)18 |
| LP-6818-51-IP1 | Exp | 100 | C 12-14-(PO)6(EO)14 |
| LP-6818-51-IP2 | Exp | 100 | C 12-14-(PO)6(EO)16 |
| LP-6818-53-IP3 | Exp | 100 | C 12-14-(PO)6(EO)18 |
| LP-6818-53-FB | Exp | 100 | C 12-14-(PO)6(EO)20 |
| LP-6818-66-IP2 | Exp | 100 | TDA-(PO)4 |
| LP-6818-67-IP3 | Exp | 100 | TDA-(PO)4(EO)8 |
| LP-6818-67-IP4 | Exp | 100 | TDA-(PO)4(EO)10 |
| LP-6818-67-IP5 | Exp | 100 | TDA-(PO)4(EO)12 |
| LP-6818-68-IP5 | | | |
| LP-6818-68-IP6 | Exp | 100 | TDA-(PO)4(EO)14 |
| LP-6818-68-FB | Exp | 100 | TDA-(PO)4(EO)18 |
| | Exp | 100 | C 12-14-(PO)20(EO)2 |
| | Exp | 100 | C 12-14-(PO)20(EO)4 |
| | Exp | 100 | C 12-(PO)20(EO)6 |
| Isofol 12 PO5EO5 | Exp | 100 | Guerbet C 12-(PO)5(EO)5 |

TABLE 1-continued

| Extended Surfactants | Source | % Active | Structure |
|---|---|---|---|
| Isofol 12 PO5EO8 | Exp | 100 | Guerbet C 12-(PO)5(EO)8 |
| Isofol 12 PO8EO5 | Exp | 100 | Guerbet C 12-(PO)8(EO)5 |
| Isofol 12 PO8EO8 Capped | Exp | 100 | Guerbet C 12-(PO)8(EO)8 |
| Triton DF-12 | DOW | 100 | C 8-10-(PO)2(EO)11-Benzyl |
| Plurafac SLF-180 | BASF | 100 | C10 Guerbet alcohol (PO)3(EO)10(PO)10 |

** Exp are manufactured by Ecolab

Particularly preferred are branched Ethyl Hexyl $(PO)_5$ $(EO)_{6\ or\ 9}$ extended nonionic surfactants. More preferably branched at position 2. In additional embodiments, the branched ethyl hexyl extended alcohol may be paired with a Guerbet alcohol, such as the Lutensol series of surfactants from BASF. (3 propyl heptanol Guerbet alcohol C10-(PO) a(EO)b series, where a is 1.0 to 1.5, and b is 4 to 14). The surfactant system may be used alone as a booster, comprising surfactant and a carrier, (such as water) or may comprise from about 0.005 weight percent to about 5.0 weight percent of actives, preferably about 0.01 weight percent to about 3.0 weight percent, and more preferably about 0.05 weight percent to about 1.0 weight percent actives as part of a cleaning composition.

Additional Nonionic Surfactant

In certain embodiments, additional nonionic surfactants may be used in a cleaning composition along with the surfactants disclosed. Useful nonionic surfactants include:

Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co. This includes Guerbet alcohols such as those sold under the Lutensol name from BASF.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application herein. All of these ester moieties have one or more reactive hydrogen sites on their molecule which can undergo further acylation or ethylene oxide (alkoxide) addition to control the hydrophilicity of these substances.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_{10}$-$C_{18}$ ethoxylated fatty alcohols with a degree of ethoxylation of from 3 to 50.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from 6 to 30 carbon atoms and a polysaccharide, e.g., a polyglycoside, hydrophilic group containing from 1.3 to 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

The treatise Nonionic Surfactants, edited by Schick, M. J., Vol. 1 of the Surfactant Science Series, Marcel Dekker, Inc., New York, 1983 is an excellent reference on the wide variety of nonionic compounds generally employed. A typical listing of nonionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

In some embodiments the non-ionic surfactant is a Guerbet alcohol ethoxylate of the formula $R^1$—$(OC_2H_4)_n$—(OH), wherein $R^1$ is a branched $C_9$-$C_{20}$ alkyl group and n is from 2 to 10.

In a preferred embodiment the Guerbet alcohol ethoxylate being used in the liquid surfactant system is a Guerbet alcohol ethoxlyate of the formula $R^1$—$(OC_2H_4)_n$—(OH), This includes a Guerbet alcohol ethoxylate where $R^1$ is a branched $C_{10}$ to $C_{18}$ alkyl group and n is from 5 to 10, preferably 7 to 9 and also ones wherein $R^1$ is $C_8$ to $C_{12}$ branched alkyl group, preferably branched $C_{10}$ alkyl group and n is 2 to 4, preferably 3. Such Guerbet alcohols are available, for example, under the trade name Lutensol from BASF or Eutanol G from Cognis.

The Guerbet reaction is a self-condensation of alcohols by which alcohols having branched alkyl chains are produced. The reaction sequence is related to the Aldol condensation and occurs at high temperatures under catalytic conditions. The product is a branched alcohol with twice the molecular weight of the reactant minus a mole of water. The reaction proceeds by a number of sequential reaction steps. At first the alcohol is oxidised to an aldehyde. Then Aldol condensation takes place after proton extraction. Thereafter the aldol product is dehydrated and the hydrogenation of the allylic aldehyde takes place.

These products are called Guerbet alcohols and are further reacted to the non-ionic alkoxylated Guerbet alcohols by alkoxylation with i.e. ethylene oxide or propylene oxide. The ethoxylated Guerbet alcohols have a lower solubility in water compared to the linear ethoxylated alcohols with the same number of carbon atoms. Therefore the exchange of linear fatty alcohols by branched fatty alcohols makes it necessary to use good solubilizers which are able to keep the guerbet alcohol in solution and the resulting emulsion stable even over a longer storage time.

In certain embodiments the surfactant systems include one or more other suitable polymers which may be used such as alkyl aryl sulfonates. Suitable alkyl aryl sulfonates that can be used in the cleaning composition can have an alkyl group that contains 6 to 24 carbon atoms and the aryl group can be at least one of benzene, toluene, and xylene. A suitable alkyl aryl sulfonate includes linear alkyl benzene sulfonate. A suitable linear alkyl benzene sulfonate includes linear dodecyl benzyl sulfonate that can be provided as the sulfonic acid that is neutralized to form the sulfonate. Additional suitable alkyl aryl sulfonates include xylene sulfonate and cumene sulfonate.

Suitable alkane sulfonates that can be used in the cleaning composition can have an alkane group having 6 to 24 carbon atoms. Suitable alkane sulfonates that can be included are secondary alkane sulfonates. A suitable secondary alkane sulfonate includes sodium $C_{14}$-$C_{17}$ secondary alkyl sulfonate commercially available as Hostapur SAS from Clariant.

In a preferred embodiment the surfactant system includes one or more of the following: a polyalkylene glycol, an ethoxylated alcohol, a polyalkylene glycol ether ethoxylate, an alkyl glucoside, an alkyl aryl sulfonate, an alkyl dimethyl amine oxide, and an alpha olefin sulfonate. In a more preferred embodiment the surfactant includes a polyethylene glycol, a linear C9-C11 alcohol ethoxylate, (preferably with 5-6 moles of ethoxylation, a Guerbet alcohol alkoxylate, such as those sold under the tradename Lutensol® (ex. BASF AG), available in a variety of grades, preferably Lutensol XP-50, a hexyl alkyl glucoside, a linear alkyl benzene sulfonate, a lauryl dimethyl amine oxide, and an alpha olefin sulfonate.

Water

The booster and cleaning compositions may comprise water in amounts that vary depending upon techniques for processing the composition.

Water provides a medium which dissolves, suspends, or carries the other components of the composition. Water can also function to deliver and wet the composition on an object.

In some embodiments, water makes up a large portion of the composition and may be the balance of the composition apart from surfactant blend, source of alkalinity, additional ingredients, and the like. The water amount and type will depend upon the nature of the composition as a whole, the environmental storage, and method of application including concentration composition, form of the composition, and intended method of delivery, among other factors. Notably the carrier should be chosen and used at a concentration which does not inhibit the efficacy of the functional components in the composition for the intended use, e.g., bleaching, sanitizing, cleaning.

In certain embodiments, the present composition includes about 5 to about 90 wt.-% water, about 10 to about 80 wt. % water, about 20 to about 60 wt % water, or about 30 to about 40 wt % water. It is to be understood that all values and ranges between these values and ranges are encompassed herein.

Cleaning Compositions

As indicated earlier, the surfactant blend of the composition may be formulated as part of a cleaning composition including a source of alkalinity and/or acid.

Source of Alkalinity

The cleaning composition includes an effective amount of one or more alkaline sources to enhance cleaning and improve soil removal performance. In general, it is expected that a concentrated cleaning composition will include the alkaline source in an amount of at least about 5% by weight, at least about 10% by weight, at least about 15% by weight, or at least about 25% by weight. In order to provide sufficient room for other components in the concentrate, the alkaline source can be provided in the concentrate in an amount of less than about 75% by weight, less than about 60% by weight, or less than about 50% by weight. In another embodiment, the alkalinity source may constitute between about 0.1% and about 90% by weight, between about 0.5% and about 80% by weight, and between about 1% and about 60% by weight of the total weight of the cleaning composition. A source of alkalinity is present in an amount sufficient to provide 500 ppm to about 5000 ppm actives in a use composition.

An effective amount of one or more alkaline sources should be considered as an amount that provides a use composition having a pH of at least about 8 and usually between about 9.5 and 13. When the use composition has a pH of between about 8 and about 10, it can be considered mildly alkaline, and when the pH is greater than about 13, the use composition can be considered caustic. In some circumstances, the cleaning composition may provide a use composition that is useful at pH levels below about 8. In such compositions, the alkaline source may be omitted, and additional pH adjusting agents may be used to provide the use composition with the desired pH.

Examples of suitable alkaline sources of the cleaning composition include, but are not limited to alkali metal carbonates and alkali metal hydroxides. Exemplary alkali metal carbonates that can be used include, but are not limited to: sodium or potassium carbonate, bicarbonate, sesquicarbonate, and mixtures thereof. Exemplary alkali metal hydroxides that can be used include, but are not limited to sodium, lithium, or potassium hydroxide. The alkali metal hydroxide may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45% and a 50% by weight solution. In one embodiment, the alkali metal hydroxide is added in the form of an aqueous solution, particularly a 50% by weight hydroxide solution, to reduce the amount of heat generated in the composition due to hydration of the solid alkali material.

In addition to the first alkalinity source, the cleaning composition may comprise a secondary alkalinity source. Examples of useful secondary alkaline sources include, but are not limited to: metal silicates such as sodium or potassium silicate or metasilicate; metal carbonates such as sodium or potassium carbonate, bicarbonate, sesquicarbonate; metal borates such as sodium or potassium borate; and ethanolamines and amines. Such alkalinity agents are commonly available in either aqueous or powdered form, either of which is useful in formulating the present cleaning compositions.

The cleaning composition may be phosphorus-free and/or nitrilotriacetic acid (NTA)-free to meet certain regulations. Phosphorus-free (also referred to as "free of phosphorous") means a concentrated composition having less than approximately 0.5 wt %, more particularly, less than approximately 0.1 wt %, and even more particularly less than approximately 0.01 wt % phosphorous based on the total weight of the concentrated composition. NTA-free (also referred to as "free of NTA") means a concentrated composition having less than approximately 0.5 wt %, less than approximately 0.1 wt %, and often less than approximately 0.01 wt % NTA based on the total weight of the concentrated composition.

Source of Acidity

The compositions can also be acidic in nature and can comprise at least one inorganic and/or organic acid in a sufficient amount in order that the compositions have a pH of 4 or less. Generally, useful inorganic acids include water soluble inorganic and mineral acids. Non-limiting examples of useful acids include hydrochloric acid, phosphoric acid, sulfuric acid, and so forth individually or in combination.

As for organic acids, non-limiting examples include any known organic acid which may be found effective in the inventive compositions. Generally useful organic acids are those which include at least one carbon atom, and include at least one carboxyl group (—COOH) in its structure. More specifically, useful organic acids contain from 1 to about 6 carbon atoms, have at least one carboxyl group, and are water soluble. Non-limiting examples include acetic acid, chloroacetic acid, citric acid, formic acid, propionic acid, and so forth.

Additional Functional Materials

The components of the surfactant booster or cleaning composition can be combined with various additional functional components. In some embodiments, the cleaning composition including the alkalinity source, acidity source, the surfactant system, and water make up a large amount, or even substantially all of the total weight of the cleaning composition, for example, in embodiments having few or no additional functional materials disposed therein. In these embodiments, the component concentrations ranges provided above for the cleaning composition are representative of the ranges of those same components in the cleaning composition.

The functional materials provide desired properties and functionalities to the detergent composition. For the purpose of this application, the term "functional materials" includes a material that when dispersed or dissolved in a use and/or concentrate, such as an aqueous solution, provides a beneficial property in a particular use. Some particular examples of functional materials are discussed in more detail below, although the particular materials discussed are given by way of example only, and that a broad variety of other functional materials may be used. For example, many of the functional materials discussed below relate to materials used in cleaning applications. However, other embodiments may include functional materials for use in other applications.

Additional Surfactants

The cleaning composition can contain an additional surfactant component that includes a detersive amount of an anionic surfactant or a mixture of anionic surfactants. Anionic surfactants are desirable in cleaning compositions because of their wetting, detersive properties, and often times good compatibility with membranes. The anionic surfactants that can be used include any anionic surfactant available in the cleaning industry. Suitable groups of anionic surfactants include sulfonates and sulfates. Suitable surfactants that can be provided in the anionic surfactant component include alkyl aryl sulfonates, secondary alkane sulfonates, alkyl methyl ester sulfonates, alpha olefin sulfonates, alkyl ether sulfates, alkyl sulfates, and alcohol sulfates.

Suitable alkyl aryl sulfonates that can be used in the cleaning composition can have an alkyl group that contains 6 to 24 carbon atoms and the aryl group can be at least one of benzene, toluene, and xylene. A suitable alkyl aryl sulfonate includes linear alkyl benzene sulfonate. A suitable linear alkyl benzene sulfonate includes linear dodecyl benzyl sulfonate that can be provided as an acid that is neutralized to form the sulfonate. Additional suitable alkyl aryl sulfonates include xylene sulfonate and cumene sulfonate.

Suitable alkane sulfonates that can be used in the cleaning composition can have an alkane group having 6 to 24 carbon atoms. Suitable alkane sulfonates that can be used include secondary alkane sulfonates. A suitable secondary alkane sulfonate includes sodium $C_{14}$-$C_{17}$ secondary alkyl sulfonate commercially available as Hostapur SAS from Clariant.

Suitable alkyl methyl ester sulfonates that can be used in the cleaning composition include those having an alkyl group containing 6 to 24 carbon atoms. Suitable alpha olefin sulfonates that can be used in the cleaning composition include those having alpha olefin groups containing 6 to 24 carbon atoms.

Suitable alkyl ether sulfates that can be used in the cleaning composition include those having between about 1 and about 10 repeating alkoxy groups, between about 1 and about 5 repeating alkoxy groups. In general, the alkoxy group will contain between about 2 and about 4 carbon atoms. A suitable alkoxy group is ethoxy. A suitable alkyl ether sulfate is sodium lauryl ether ethoxylate sulfate and is available under the name Steol CS-460.

Suitable alkyl sulfates that can be used in the cleaning composition include those having an alkyl group containing 6 to 24 carbon atoms. Suitable alkyl sulfates include, but are not limited to, sodium lauryl sulfate and sodium lauryl/myristyl sulfate.

Suitable alcohol sulfates that can be used in the cleaning composition include those having an alcohol group containing about 6 to about 24 carbon atoms.

In a preferred embodiment, the co-surfactant component is a smaller chain material, preferably less than 12 carbons and most preferably from about 6 to about 10 carbons. The surfactant and any optional co-surfactant combination together replace NPE on a 1:1 basis at the actives level.

The anionic surfactant can be neutralized with an alkaline metal salt, an amine, or a mixture thereof. Suitable alkaline metal salts include sodium, potassium, and magnesium. Suitable amines include monoethanolamine, triethanolamine, and monoisopropanolamine. If a mixture of salts is used, a suitable mixture of alkaline metal salt can be sodium and magnesium, and the molar ratio of sodium to magnesium can be between about 3:1 and about 1:1.

The cleaning composition, when provided as a concentrate, can include the surfactant component in an amount sufficient to provide a use composition having desired wetting and detersive properties after dilution with water. The concentrate can contain about 0.1 wt. % to about 0.5 wt. %, about 0.1 wt. % to about 1.0 wt. %, about 1.0 wt. % to about 5 wt. %, about 5 wt. % to about 10 wt. %, about 10 wt. % to about 20 wt. %, 30 wt. %, about 0.5 wt. % to about 25 wt. %, and about 1 wt. % to about 15 wt. %, and similar intermediate concentrations of the anionic surfactant.

The cleaning composition can contain an additional nonionic cosurfactant component that includes a detersive amount of an additional nonionic surfactant or a mixture of nonionic surfactants. Nonionic cosurfactants can be included in the cleaning composition to enhance grease removal properties. Although the additional cosurfactant component can include a nonionic surfactant component, it should be understood that the nonionic cosurfactant component can be excluded from the cleaning composition.

Nonionic cosurfactants that can be used in the composition include polyalkylene oxide surfactants (also known as polyoxyalkylene surfactants or polyalkylene glycol surfactants). Suitable polyalkylene oxide surfactants include polyoxypropylene surfactants and polyoxyethylene glycol surfactants. Suitable surfactants of this type are synthetic organic polyoxypropylene (PO)-polyoxyethylene (EO) block copolymers. These surfactants include a di-block polymer comprising an EO block and a PO block, a center block of polyoxypropylene units (PO), and having blocks of polyoxyethylene grafted onto the polyoxypropylene unit or a center block of EO with attached PO blocks. Further, this surfactant can have further blocks of either polyoxyethylene or polyoxypropylene in the molecules. A suitable average molecular weight range of useful surfactants can be about 1,000 to about 40,000 and the weight percent content of ethylene oxide can be about 10-80 wt. %.

Additional nonionic cosurfactants include alcohol alkoxylates. A suitable alcohol alkoxylate include linear alcohol ethoxylates such as Tomadol™ 1-5 which is a surfactant containing an alkyl group having 11 carbon atoms and 5 moles of ethylene oxide. Additional alcohol alkoxylates include alkylphenol ethoxylates, branched alcohol ethoxylates, secondary alcohol ethoxylates (e.g., Tergitol 15-S-7 from Dow Chemical), castor oil ethoxylates, alkylamine ethoxylates, tallow amine ethoxylates, fatty acid ethoxylates, sorbital oleate ethoxylates, end-capped ethoxylates, or mixtures thereof. Additional nonionic surfactants include amides such as fatty alkanolamides, alkyldiethanolamides, coconut diethanolamide, lauramide diethanolamide, cocoamide diethanolamide, polyethylene glycol cocoamide (e.g., PEG-6 cocoamide), oleic diethanolamide, or mixtures thereof. Additional suitable nonionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl glucosides, or mixtures thereof.

When nonionic cosurfactants are included in the cleaning composition concentrate, they can be included in an amount of at least about 0.1 wt. % and can be included in an amount of up to about 15 wt. %. The concentrate can include about 0.1 to 1.0 wt. %, about 0.5 wt. % to about 12 wt. % or about 2 wt. % to about 10 wt. % of the nonionic surfactant.

Amphoteric surfactants can also be used to provide desired detersive properties. Suitable amphoteric surfactants that can be used include, but are not limited to: betaines, imidazolines, and propionates. Suitable amphoteric surfactants include, but are not limited to: sultaines, amphopropionates, amphodipropionates, aminopropionates, aminodipropionates, amphoacetates, amphodiacetates, and amphohydroxypropylsulfonates.

When the cleaning composition includes an amphoteric surfactant, the amphoteric surfactant can be included in an amount of about 0.1 wt. % to about 15 wt. %. The concentrate can include about 0.1 wt. % to about 1.0 wt. %, 0.5 wt. % to about 12 wt. % or about 2 wt. % to about 10 wt. % of the amphoteric surfactant.

Bleaching Agents

The cleaning composition may also include bleaching agents for lightening or whitening a substrate. Examples of suitable bleaching agents include bleaching compounds capable of liberating an active halogen species, such as $Cl_2$, $Br_2$, $-OCl^-$ and/or $-OBr^-$, under conditions typically encountered during the cleansing process. Suitable bleaching agents for use in the present cleaning compositions include, for example, chlorine-containing compounds such as a chlorine, a hypochlorite, and chloramine. Exemplary halogen-releasing compounds include the alkali metal dichloroisocyanurates, chlorinated trisodium phosphate, the alkali metal hypochlorites, monochloramine and dichloramine, and the like. Encapsulated chlorine sources may also be used to enhance the stability of the chlorine source in the composition (see, for example, U.S. Pat. Nos. 4,618,914 and 4,830,773, the disclosures of which are incorporated by reference herein for all purposes). A bleaching agent may also be a peroxygen or active oxygen source such as hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. The composition can include an effective amount of a bleaching agent. When the concentrate includes a bleaching agent, it can be included in an amount of about 0.1 wt. % to about 60 wt. %, about 1 wt. % to about 20 wt. %, about 3 wt. % to about 8 wt. %, and about 3 wt. % to about 6 wt. %.

Cleaning Fillers

The cleaning composition can include an effective amount of cleaning fillers, which does not perform as a cleaning agent per se, but cooperates with the cleaning agent to enhance the overall cleaning capacity of the composition. Examples of cleaning fillers suitable for use in the present cleaning compositions include sodium sulfate, sodium chloride, starch, sugars, $C_1$-$C_{10}$ alkylene glycols such as propylene glycol, and the like. When the concentrate includes a cleaning filler, it can be included in an amount of between about 1 wt. % and about 20 wt. % and between about 3 wt. % and about 15 wt. %.

Stabilizing Agents

Stabilizing agents that can be used in the cleaning composition include, but are not limited to: primary aliphatic amines, betaines, borate, calcium ions, sodium citrate, citric acid, sodium formate, glycerine, malonic acid, organic diacids, polyols, propylene glycol, and mixtures thereof. The concentrate need not include a stabilizing agent, but when the concentrate includes a stabilizing agent, it can be included in an amount that provides the desired level of stability of the concentrate. Exemplary ranges of the stabilizing agent include up to about 20 wt. %, between about 0.5 wt. % to about 15 wt. % and between about 2 wt. % to about 10 wt. %.

Dispersants

Dispersants that can be used in the cleaning composition include maleic acid/olefin copolymers, polyacrylic acid, and its copolymers, and mixtures thereof. The concentrate need not include a dispersant, but when a dispersant is included it can be included in an amount that provides the desired dispersant properties. Exemplary ranges of the dispersant in the concentrate can be up to about 20 wt. %, between about 0.5 w. % and about 15 wt. %, and between about 2 wt. % and about 9 wt. %.

Hydrotrope

The compositions may optionally include a hydrotrope that aides in compositional stability and aqueous formulation. Functionally speaking, the suitable hydrotrope couplers which can be employed are non-toxic and retain the active ingredients in aqueous solution throughout the temperature range and concentration to which a concentrate or any use solution is exposed.

Any hydrotrope coupler may be used provided it does not react with the other components of the composition or negatively affect the performance properties of the composition. Representative classes of hydrotropic coupling agents or solubilizers which can be employed include anionic surfactants such as alkyl sulfates and alkane sulfonates, linear alkyl benzene or naphthalene sulfonates, secondary alkane sulfonates, alkyl ether sulfates or sulfonates, alkyl phosphates or phosphonates, dialkyl sulfosuccinic acid esters, sugar esters (e.g., sorbitan esters), amine oxides (mono-, di-, or tri-alkyl) and $C_8$-$C_{10}$ alkyl glucosides. Preferred coupling agents include n-octanesulfonate, available as NAS 8D from Ecolab Inc., n-octyl dimethylamine oxide, and the commonly available aromatic sulfonates such as the alkyl benzene sulfonates (e.g. xylene sulfonates) or naphthalene sulfonates, aryl or alkaryl phosphate esters or their alkoxylated analogues having 1 to about 40 ethylene, propylene or butylene oxide units or mixtures thereof. Other preferred hydrotropes include nonionic surfactants of $C_6$-$C_{24}$ alcohol alkoxylates (alkoxylate means ethoxylates, propoxylates, butoxylates, and co-or-terpolymer mixtures thereof) (preferably $C_6$-$C_{14}$ alcohol alkoxylates) having 1 to about 15 alkylene oxide groups (preferably about 4 to about 10 alkylene oxide groups); $C_6$-$C_{24}$ alkylphenol alkoxylates (preferably $C_5$-$C_{10}$ alkylphenol alkoxylates) having 1 to about 15 alkylene oxide groups (preferably about 4 to about 10 alkylene oxide groups); $C_6$-$C_{24}$ alkylpolyglycosides (preferably $C_6$-$C_{20}$ alkylpolyglycosides) having 1 to about 15 glycoside groups (preferably about 4 to about 10 glycoside groups); $C_6$-$C_{24}$ fatty acid ester ethoxylates, propoxylates or glycerides; and $C_4$-$C_{12}$ mono or dialkanolamides. A preferred hydrotrope is sodium cumenesulfonate (SCS).

The composition of an optional hydrotrope can be present in the range of from about 0 to about 25 percent by weight.

Water Conditioning Agent/Chelant

Water conditioning agents function to inactivate water hardness and prevent calcium and magnesium ions from interacting with soils, surfactants, carbonate and hydroxide. Water conditioning agents therefore improve detergency and prevent long term effects such as insoluble soil redepositions, mineral scales and mixtures thereof. Water conditioning can be achieved by different mechanisms including sequestration, precipitation, ion-exchange and dispersion (threshold effect).

The water conditioning agents which can be used include inorganic water soluble water conditioning agents, inorganic water insoluble water conditioning agents, organic water soluble conditioning agents, and organic water insoluble water conditioning agents. Exemplary inorganic water soluble water conditioning agents include all physical forms of alkali metal, ammonium and substituted ammonium salts of carbonate, bicarbonate and sesquicarbonate; pyrophosphates, and condensed polyphosphates such as tripolyphosphate, trimetaphosphate and ring open derivatives; and, glassy polymeric metaphosphates of general structure $M_n + 2P_nO_3n+1$ having a degree of polymerization n of from about 6 to about 21 in anhydrous or hydrated forms; and, mixtures thereof. Exemplary inorganic water insoluble water conditioning agents include aluminosilicate builders. Exemplary water soluble water conditioning agents include iminoacetates, polyphosphonates, aminopolyphosphonates, short chain carboxylates and polycarboxylates. Organic water soluble water conditioning agents useful in the compositions of the present compositions include aminpolyacetates, polyphosphonates, aminopolyphosphonates, short chain carboxylates and a wide variety of polycarboxylate compounds.

Aminopolyacetate water conditioning salts suitable for use herein include the sodium, potassium lithium, ammonium, and substituted ammonium salts of the following acids: ethylenediaminetetraacetic acid, N-(2-hydroxyethyl)-ethylenediamine triacetic acid, N-(2-hydroxyethyl)-nitrilodiacetic acid, diethylenetriaminepentaacetic acid, 1,2-diaminocyclohexanetetracetic acid and nitrilotriacetic acid; and, mixtures thereof. Polyphosphonates useful herein specifically include the sodium, lithium and potassium salts of ethylene diphosphonic acid; sodium, lithium and potassium salts of ethane-1-hydroxy-1,1-diphosphonic acid and sodium lithium, potassium, ammonium and substituted ammonium salts of ethane-2-carboxy-1,1-diphosphonic acid, hydroxymethanediphosphonic acid, carbonyldiphosphonic acid, ethane-1-hydroxy-1,1,2-triphosphonic acid, ethane-2-hydroxy-1,1,2-triphosphonic acid, propane-1,1,3,3-tetraphosphonic acid propane-1,1,2,3-tetraphophonic acid and propane 1,2,2,3-tetraphosphonic acid; and mixtures thereof. Examples of these polyphosphonic compounds are disclosed in British Pat. No. 1,026,366. For more examples see U.S. Pat. No. 3,213,030 to Diehl issued Oct. 19, 1965 and U.S. Pat. No. 2,599,807 to Bersworth issued Jun. 10, 1952. Aminopolyphosphonate compounds are excellent water conditioning agents and may be advantageously used. Suitable examples include soluble salts, e.g. sodium, lithium or potassium salts, of diethylene thiamine pentamethylene phosphonic acid, ethylene diamine tetramethylene phosphonic acid, hexamethylenediamine tetramethylene phosphonic acid, and nitrilotrimethylene phosphonic acid; and, mixtures thereof. Water soluble short chain carboxylic acid salts constitute another class of water conditioner for use herein. Examples include citric acid, gluconic acid and phytic acid. Preferred salts are prepared from alkali metal ions such as sodium, potassium, lithium and from ammonium and substituted ammonium. Suitable water soluble polycarboxylate water conditioners include the various ether polycarboxylates, polyacetal, polycarboxylates, epoxy polycarboxylates, and aliphatic-, cycloalkane- and aromatic polycarboxylates.

Enzymes

Enzymes can be used to catalyze and facilitate organic and inorganic reactions. It is well known, for example, that enzymes are used in metabolic reactions occurring in animal and plant life.

The enzymes that can be used include simple proteins or conjugated proteins produced by living organisms and functioning as biochemical catalysts which, in cleaning technology, degrade or alter one or more types of soil residues encountered on food process equipment surfaces thus removing the soil or making the soil more removable by the cleaning system. Both degradation and alteration of soil residues improve detergency by reducing the physicochemical forces which bind the soil to the surface being cleaned, i.e. the soil becomes more water soluble. The enzyme may be functional in either the acidic, neutral or alkaline pH range.

Enzymes are extremely effective catalysts. In practice, very small amounts will accelerate the rate of soil degradation and soil alteration reactions without themselves being consumed in the process. Enzymes also have substrate (soil) specificity which determines the breadth of its catalytic effect Some enzymes interact with only one specific substrate molecule (absolute specificity); whereas, other enzymes have broad specificity and catalyze reactions on a family of structurally similar molecules (group specificity).

Enzymes exhibit catalytic activity by virtue of three general characteristics: the formation of a noncovalent complex with the substrate, substrate specificity, and catalytic rate. Many compounds may bind to an enzyme, but only certain types will lead to subsequent reaction. The latter are called substrates and satisfy the particular enzyme specificity requirement. Materials that bind but do not thereupon chemically react can affect the enzymatic reaction either in a positive or negative way. For example, unreacted species called inhibitors interrupt enzymatic activity.

Several enzymes may fit into more than one class. A valuable reference on enzymes is "Industrial Enzymes", Scott, D., in Kirk-Othmer Encyclopedia of Chemical Technology, 3rd Edition, (editors Grayson, M. and EcKroth, D.) Vol. 9, pp. 173-224, John Wiley & Sons, New York, 1980.

Proteases, a sub-class of hydrolases, are further divided into three distinct subgroups which are grouped by the pH optima (i.e. optimum enzyme activity over a certain pH range). These three subgroups are the alkaline, neutral and acids proteases. These proteases can be derived from vegetable, animal or microorganism origin; but, preferably are of the latter origin which includes yeasts, molds and bacteria. Examples of suitable commercially available alkaline proteases are Alkalize®, Savinase®, and Esperase®-all of Novo Industri AS, Denmark; Purafect® of Genencor International; Maxacal®, Maxapem® and Maxatase®-all of Gist-Brocase International NV, Netherlands; Optimase® and Opticlean® of Solvay Enzymes, USA and so on.

Commercial alkaline proteases are obtainable in liquid or dried form, are sold as raw aqueous solutions or in assorted purified, processed and compounded forms, and are comprised of about 2% to about 80% by weight active enzyme generally in combination with stabilizers, buffers, cofactors, impurities and inert vehicles. The actual active enzyme content depends upon the method of manufacture and is not critical, assuming the cleaning solution has the desired enzymatic activity. The particular enzyme chosen for use in the process and products depend upon the conditions of final utility, including the physical product form, use pH, use temperature, and soil types to be degraded or altered. The enzyme can be chosen to provide optimum activity and stability for any given set of utility conditions.

Naturally, mixtures of different proteolytic enzymes may be used. While various specific enzymes have been described above, it is to be understood that any protease which can confer the desired proteolytic activity to the composition may be used.

In addition to proteases, it is also to be understood, and one skilled in the art will see from the above enumeration, that other enzymes which are well known in the art may also be used with the composition. Included are other hydrolases such as esterases, carboxylases and the like; and, other enzyme classes.

Further, in order to enhance its stability, the enzyme or enzyme admixture may be incorporated into various non-liquid embodiments as a coated, encapsulated, agglomerated, prilled or marumerized form. Also, to enhance stability, the enzyme or enzyme admixture may be incorporated into various non-aqueous embodiments such as propylene glycol, glycerin, etc.

pH Adjusting Agents

Various pH adjusting agents can be utilized to alter the pH of the treatment composition. The pH adjusting agents can provide desired buffering systems. Exemplary alkaline pH adjusting agents include carbonate, bicarbonate, sodium hydroxide, tetraborate, and boric acid. A buffering system that includes carbonate and bicarbonate can provide an exemplary pH of between about 9 and about 10, a buffering system that includes carbonate and sodium hydroxide can provide an exemplary pH of between about 9 and about 11, and a buffering system that includes sodium tetraborate and boric acid can include a pH of between about 7.6 and about 9.2. The pH adjusting agent can include an acid to provide an acidic buffering system. Exemplary acids include citric acid, citrate, acetic acid, acetate, phosphoric acid, and phosphate. For example, a buffering system including citric acid and sodium hydroxide can provide an exemplary pH of between about 2.2 and about 6.5, a buffering system that includes sodium citrate and citric acid can provide an exemplary pH of between about 3.0 and about 6.2, a buffering system that includes sodium acetate and acetic acid can provide an exemplary pH of between about 3.6 and about 5.6, and a buffering system that includes sodium dihydrogen phosphate and disodium hydrogen phosphate can provide an exemplary pH of between about 5.8 and about 8.0.

Clean in Place

The membrane cleaning compositions and methods are generally clean-in-place systems (CIP), clean-out-of-place systems (COP), textile laundry machines, micro, ultra, nano and reverse osmosis filtration systems. COP systems can include readily accessible systems including wash tanks, soaking vessels, mop buckets, holding tanks, scrub sinks, vehicle parts washers, non-continuous batch washers and systems, and the like. CIP systems include the internal components of tanks, lines, pumps and other process equipment used for processing typically liquid product streams such as beverages, milk, and juices. CIP systems are cleaned without dismantling the components and without mechanical abrasion such as scrubbing etc.

Generally, the cleaning of the in-place system or other surface (i.e., removal of unwanted offal therein) is accomplished with an alkaline cleaning which is introduced with heated water. The compositions may be introduced during, prior to, or concurrently with the cleaning step (as a separate booster or as part of the cleaning composition) and are applied or introduced into the system at a use solution concentration in unheated, ambient temperature water. CIP typically employ flow rates on the order of about 40 to about 600 liters per minute, temperatures from ambient up to about 70° C., and contact times of at least about 10 seconds, for example, about 30 to about 120 seconds. The present composition can remain in solution in cold (e.g., 40° F./4° C.) water and heated (e.g., 140° F./60° C.) water. Although it is not normally necessary to heat the aqueous use solution of the present composition, under some circumstances heating may be desirable to further enhance its activity. These materials are useful at any conceivable temperatures.

Membrane Treating Programs

Various different treatment programs can be used to treat a membrane. The method for treating a membrane can include a plurality of steps. A first step can be referred to as a product removal step or displacement where product (whey, milk, etc.) is removed from the filtration system. The product can be effectively recovered and used as opposed to discharging as plant effluent. In general, the product removal step can be characterized as an exchange step where water, gas, or multiple phase flow displaces the product from the membrane system. The product removal step can last as long as it takes to remove and recover product from the filtration system. In general, it is expected that the product removal step will take at least a couple minutes for most dairy filtration systems.

Another step often used can be referred to as a pre-rinse step. In general, water and/or an alkaline solution can be circulated in the filtration system to remove gross soils. It should be understood that a large scale filtration system refers to an industrial system having at least about 10 membrane vessels, at least about 40 membranes, and a total membrane area of at least about 200 m$^2$. Industrial filtration systems for use in dairy and brewery applications often include about 10 to about 200 membrane vessels, about 40 to about 1,000 membranes, and a total membrane area of about 200 m$^2$ to about 10,000 m$^2$.

Several chemistry treatment cycles can be repeated for acid treatment, alkaline treatment, and neutral treatment. In general, the various treatments can be provided with or without an enzyme.

The liquid component can be provided as an alkaline treatment, an acidic treatment, a neutral treatment, a solvent treatment and/or as an enzymatic treatment.

By way of example, the surfactant system can be used in various steps in the filter cleaning process. For example, rinsing can be accomplished with the surfactant system of alone or as a neutral, acidic, or alkaline solution. Cleaning can be accomplished using a cleaning composition that can include alkaline, acid, enzymes, non-aqueous components, and/or the surfactant system. Sanitizing and/or preserving can be accomplished with a composition that includes chlorine, acids, peracids, and/or reducing compositions. A penetrant is generally considered to be a component that penetrates into the soil and softens the soil for removal. The penetrant can be selected for the particular type of soil expected on the membrane. In the case of membranes used in the dairy industry, it is expected that the penetrant will be selected to provide for penetration into protein and lipid soils.

Forming a Concentrate

The concentrate composition can be provided as a solid, liquid, or gel, or a combination thereof. In one embodiment, the cleaning compositions may be provided as a concentrate such that the cleaning composition is substantially free of any added water or the concentrate may contain a nominal amount of water. The concentrate can be formulated without any water or can be provided with a relatively small amount of water in order to reduce the expense of transporting the concentrate. For example, the composition concentrate can be provided as a capsule or pellet of compressed powder, a solid, or loose powder, either contained by a water soluble material or not. In the case of providing the capsule or pellet of the composition in a material, the capsule or pellet can be introduced into a volume of water, and if present the water soluble material can solubilize, degrade, or disperse to allow contact of the composition concentrate with the water. For the purposes of this disclosure, the terms "capsule" and "pellet" are used for exemplary purposes and are not intended to limit the delivery mode to a particular shape.

When provided as a liquid concentrate composition, the concentrate can be diluted through dispensing equipment using aspirators, peristaltic pumps, gear pumps, mass flow meters, and the like. This liquid concentrate embodiment can also be delivered in bottles, jars, dosing bottles, bottles with dosing caps, and the like. The liquid concentrate composition can be filled into a multi-chambered cartridge insert that is then placed in a spray bottle or other delivery device filled with a pre-measured amount of water.

In yet another embodiment, the concentrate composition can be provided in a solid form that resists crumbling or other degradation until placed into a container. Such container may either be filled with water before placing the composition concentrate into the container, or it may be filled with water after the composition concentrate is placed into the container. In either case, the solid concentrate composition dissolves, solubilizes, or otherwise disintegrates upon contact with water. In a particular embodiment, the solid concentrate composition dissolves rapidly thereby allowing the concentrate composition to become a use composition and further allowing the end user to apply the use composition to a surface in need of cleaning. When the cleaning composition is provided as a solid, the compositions provided above may be altered in a manner to solidify the cleaning composition by any means known in the art. For example, the amount of water may be reduced or additional ingredients may be added to the cleaning composition, such as a solidification agent.

In another embodiment, the solid concentrate composition can be diluted through dispensing equipment whereby water is sprayed at the solid block forming the use solution. The water flow is delivered at a relatively constant rate using mechanical, electrical, or hydraulic controls and the like. The solid concentrate composition can also be diluted through dispensing equipment whereby water flows around the solid block, creating a use solution as the solid concentrate dissolves. The solid concentrate composition can also be diluted through pellet, tablet, powder and paste dispensers, and the like.

The water used to dilute the concentrate (water of dilution) can be available at the locale or site of dilution. The water of dilution may contain varying levels of hardness depending upon the locale. Service water available from various municipalities have varying levels of hardness. It is desirable to provide a concentrate that can handle the hardness levels found in the service water of various municipalities. The water of dilution that is used to dilute the concentrate can be characterized as hard water when it includes at least 1 grain hardness. It is expected that the water of dilution can include at least 5 grains hardness, at least 10 grains hardness, or at least 20 grains hardness.

It is expected that the concentrate will be diluted with the water of dilution in order to provide a use solution having a desired level of detersive properties. If the use solution is required to remove tough or heavy soils, it is expected that the concentrate can be diluted with the water of dilution at a weight ratio of at least 1:1 and up to 1:8. If a light duty cleaning use solution is desired, it is expected that the concentrate can be diluted at a weight ratio of concentrate to water of dilution of up to about 1:256.

In an alternate embodiment, the cleaning compositions may be provided as a ready-to-use (RTU) composition. If the cleaning composition is provided as a RTU composition, a more significant amount of water is added to the cleaning composition as a diluent. When the concentrate is provided as a liquid, it may be desirable to provide it in a flowable form so that it can be pumped or aspirated. It has been found that it is generally difficult to accurately pump a small amount of a liquid. It is generally more effective to pump a larger amount of a liquid. Accordingly, although it is desirable to provide the concentrate with as little water as possible in order to reduce transportation costs, it is also desirable to provide a concentrate that can be dispensed accurately. In the case of a liquid concentrate, it is expected that water will be present in an amount of up to about 90 wt. %, particularly between about 20 wt. % and about 85 wt. %, more particularly between about 30 wt. % and about 80 wt. % and most particularly between about 50 wt. % and about 80 wt. %.

In the case of a RTU composition, it should be noted that the above-disclosed cleaning composition may, if desired, be further diluted with up to about 96 wt. % water, based on the weight of the cleaning composition.

The cleaning composition may be made using a mixing process. The surfactant booster composition and/or cleaning composition comprising the same and other functional ingredients are mixed for an amount of time sufficient to form a final, homogeneous composition. In an exemplary embodiment, the components of the cleaning composition are mixed for approximately 10 minutes.

A solid cleaning composition as used in the present disclosure encompasses a variety of forms including, for example, solids, pellets, blocks, tablets, and powders. By way of example, pellets can have diameters of between about 1 mm and about 10 mm, tablets can have diameters of between about 1 mm and about 10 mm or between about 1 cm and about 10 cm, and blocks can have diameters of at least about 10 cm. It should be understood that the term "solid" refers to the state of the cleaning composition under the expected conditions of storage and use of the solid cleaning composition. In general, it is expected that the cleaning composition will remain a solid when provided at a temperature of up to about 100° F. or lower than about 120° F.

In certain embodiments, the solid cleaning composition is provided in the form of a unit dose. A unit dose refers to a solid cleaning composition unit sized so that the entire unit is used during a single cycle. When the solid cleaning composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid cleaning composition is provided in the form of a multiple-use solid, such as, a block or a plurality of pellets, and can be repeatedly used to generate aqueous cleaning compositions for multiple washing cycles. In certain embodiments, the solid cleaning composition is provided as a solid having a mass of about 5 g to about 10 kg. In certain embodiments, a multiple-use form of the solid cleaning composition has a mass of about 1 kg to about 10 kg. In further embodiments, a multiple-use form of the solid cleaning composition has a mass of about 5 kg to about 8 kg. In other embodiments, a multiple-use form of the solid cleaning composition has a mass of about 5 g to about 1 kg, or about 5 g and to about 500 g.

The components can be mixed and extruded or cast to form a solid such as pellets, powders or blocks. Heat can be applied from an external source to facilitate processing of the mixture.

A mixing system provides for continuous mixing of the ingredients at high shear to form a substantially homogeneous liquid or semi-solid mixture in which the ingredients are distributed throughout its mass. The mixing system includes means for mixing the ingredients to provide shear effective for maintaining the mixture at a flowable consistency, with a viscosity during processing of about 1,000-1,000,000 cP, preferably about 50,000-200,000 cP. The mixing system can be a continuous flow mixer or a single or twin screw extruder apparatus.

The mixture can be processed at a temperature to maintain the physical and chemical stability of the ingredients, such as at ambient temperatures of about 20-80° C., and about 25-55° C. Although limited external heat may be applied to the mixture, the temperature achieved by the mixture may become elevated during processing due to friction, variances in ambient conditions, and/or by an exothermic reaction between ingredients. Optionally, the temperature of the mixture may be increased, for example, at the inlets or outlets of the mixing system.

An ingredient may be in the form of a liquid or a solid such as a dry particulate, and may be added to the mixture separately or as part of a premix with another ingredient, as for example, the scale control component may be separate from the remainder of the cleaning composition. One or more premixes may be added to the mixture.

The ingredients are mixed to form a substantially homogeneous consistency wherein the ingredients are distributed substantially evenly throughout the mass. The mixture can be discharged from the mixing system through a die or other shaping means. The profiled extrudate can be divided into useful sizes with a controlled mass. The extruded solid can be packaged in film. The temperature of the mixture when discharged from the mixing system can be sufficiently low to enable the mixture to be cast or extruded directly into a packaging system without first cooling the mixture. The time between extrusion discharge and packaging can be adjusted to allow the hardening of the cleaning block for better handling during further processing and packaging. The mixture at the point of discharge can be about 20-90° C., and about 25-55° C. The composition can be allowed to harden to a solid form that may range from a low density, sponge-like, malleable, caulky consistency to a high density, fused solid, concrete-like block.

Optionally, heating and cooling devices may be mounted adjacent to mixing apparatus to apply or remove heat in order to obtain a desired temperature profile in the mixer. For example, an external source of heat may be applied to one or more barrel sections of the mixer, such as the ingredient inlet section, the final outlet section, and the like, to increase fluidity of the mixture during processing. Preferably, the temperature of the mixture during processing, including at the discharge port, is maintained preferably at about 20-90° C.

When processing of the ingredients is completed, the mixture may be discharged from the mixer through a discharge die. The solidification process may last from a few minutes to about six hours, depending, for example, on the size of the cast or extruded composition, the ingredients of the composition, the temperature of the composition, and other like factors. Preferably, the cast or extruded composition "sets up" or begins to harden to a solid form within about 1 minute to about 3 hours, preferably about 1 minute to about 2 hours, most preferably about 1 minute to about 1.0 hours minutes.

The concentrate can be provided in the form of a liquid. Various liquid forms include gels and pastes. Of course, when the concentrate is provided in the form of a liquid, it is not necessary to harden the composition to form a solid. In fact, it is expected that the amount of water in the composition will be sufficient to preclude solidification. In addition, dispersants and other components can be incorporated into the concentrate in order to maintain a desired distribution of components.

In certain embodiments, the cleaning composition may be mixed with a water source prior to or at the point of use. In other embodiments, the cleaning compositions do not require the formation of a use solution and/or further dilution and may be used without further dilution.

In aspects employing solid cleaning compositions, a water source contacts the cleaning composition to convert solid cleaning compositions, particularly powders, into use solutions. Additional dispensing systems may also be utilized which are more suited for converting alternative solid cleanings compositions into use solutions. The methods of the include use of a variety of solid cleaning compositions, including, for example, extruded blocks or "capsule" types of package.

In an aspect, a dispenser may be employed to spray water (e.g. in a spray pattern from a nozzle) to form a cleaning use solution. For example, water may be sprayed toward an apparatus or other holding reservoir with the cleaning composition, wherein the water reacts with the solid cleaning composition to form the use solution. In certain embodiments of the methods, a use solution may be configured to drip downwardly due to gravity until the dissolved solution of the cleaning composition is dispensed for use.

EXAMPLES

Example 1

Cloud Point Study

The cloud point is the temperature in which a surfactant is no longer miscible in water and thus precipitates out of the solution as oil. A surfactant above its cloud point will not clean as well as one below its cloud point, but a surfactant above its cloud point will defoam better than a surfactant below its cloud point. Basically, cloud point can be visually detected when the solution becomes turbid as temperature increases. In this work, we applied the turbidity meter for a cloud point detection.

For our measurement, a 1000 mL of aqueous surfactant solution was prepared at 1% w/v at pH 11. The temperature was increased at a constant rate with proper agitation to ensure a uniform solution temperature while not creating the bubble from too strong agitation. Turbidity readings were taken automatically and the slope of the turbidity vs time can be calculated. The cloud point was taken at the point where the sharp change of slope occurred.

As temperature closes to cloud point, the nonionic surfactant becomes more hydrophobic. Once the temperature is above the cloud point, the nonionic surfactant becomes oil-like phase, loses its detergency, and fouls the membrane, as shown in Tables A and B.

Ecosurf EH-3 is a branched (2-ethyl-hexyl alkoxylate) C8 ethyl hexyl $(PO)_5(EO)_3$ nonionic extended surfactant commercially available from Dow Chemical, Midland Michigan
Ecosurf EH-6 is a is a commercially available branched C8 ethyl hexyl $(PO)_5(EO)_6$ nonionic extended surfactant
Ecosurf EH-9 is a is a commercially available branched C8 ethyl hexyl $(PO)_5(EO)_9$ nonionic extended surfactant
Results are shown in Table A and B

TABLE A

Result of coupon test Temperature 50 C., pH 11, 10 min, actives = 1000 ppm

|  | % butterfat removal from PS coupon @ 50 C. | Cloud point | Cmc (RT, w/o salt) |
| --- | --- | --- | --- |
| Ecosurf EH-3 | 47.8 | * | 480 |
| Ecosurf EH-6 | 72.1 | 40 | 914 |
| Ecosurf EH-9 | 84.6 | 64 | 1066 |

TABLE B

| *Experimental XL | % butterfat removal from PS coupon @ 40 C. | Cloud point | Cmc |
| --- | --- | --- | --- |
| 3PH-8PO3EO | 29.5 | 2.97 | 2397 |
| 3PH-8PO6EO | 53.1 | 19.7 | 1190 |
| 3PH-8PO8EO | 54.9 | 32.51 | 485 |
| 3PH-8EO10EO | 62.9 | 46.95 | 185 |

Experimental XL is propyl heptyl (PO)m (EO)n Temperature 40 C., pH11, 10 min, actives = 1000 ppm Example 2

Mechanistic Study of Butterfat Removal—Dynamic Interfacial Tension $(IFT_{dyn})$ Measurement Dynamic interfacial tension measurements were performed using a spinning drop Tensiometer (SVT15N). A small volume of liquid ghee was injected into a capillary containing the aqueous surfactant solution at pH 11. The capillary was spun at 4000 rpm in a constant controlled chamber at temperature of 50 C. The $IFT_{dyn}$ value was taken once the interfacial tension reached the equilibrium or at 30 min.

Figure 2:
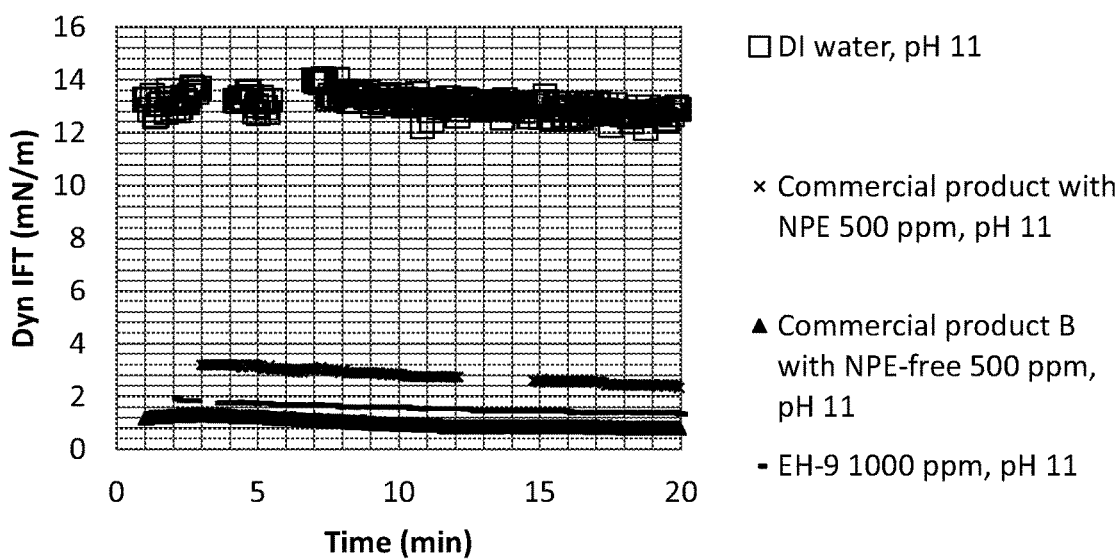
FIG. 2 is a graph of dynamic IFT measured at 50° C., 400 rpm against palm oil.
Figure 3:
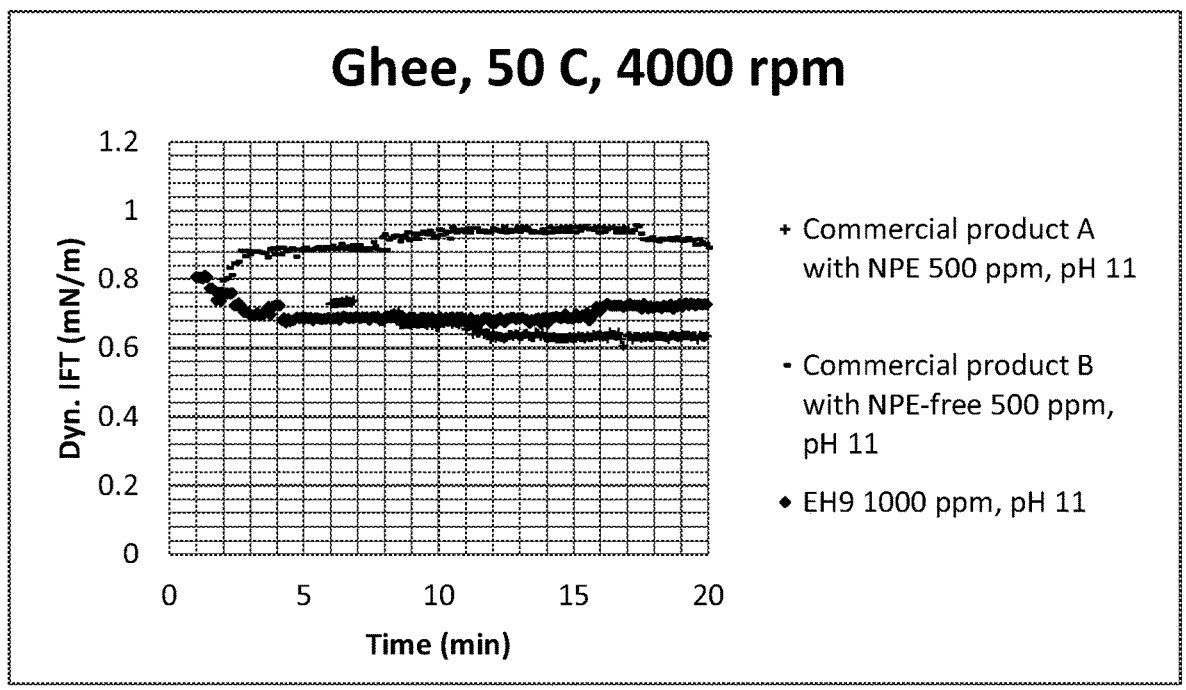
FIG. 3 is a graph of dynamic IFT measured at 50° C., 400 rpm against ghee.

Dynamic IFT was measured at 50 C, 4000 rpm against peanut oil, palm oil, and ghee. Results are shown in FIGS. 1, 2, and 3, respectively. From the figures one can see that Commercially available membrane cleaning product with NPE, Commercially available cleaning product with cocoamine oxide, and EH9 have comparable low interfacial tension against peanut oil, palm oil and ghee (less than 7).

Example 3

Wettability of Cleaning Solution on Polysulfone (PS) Coupon by Contact Angle Measurement.

Figure 4:
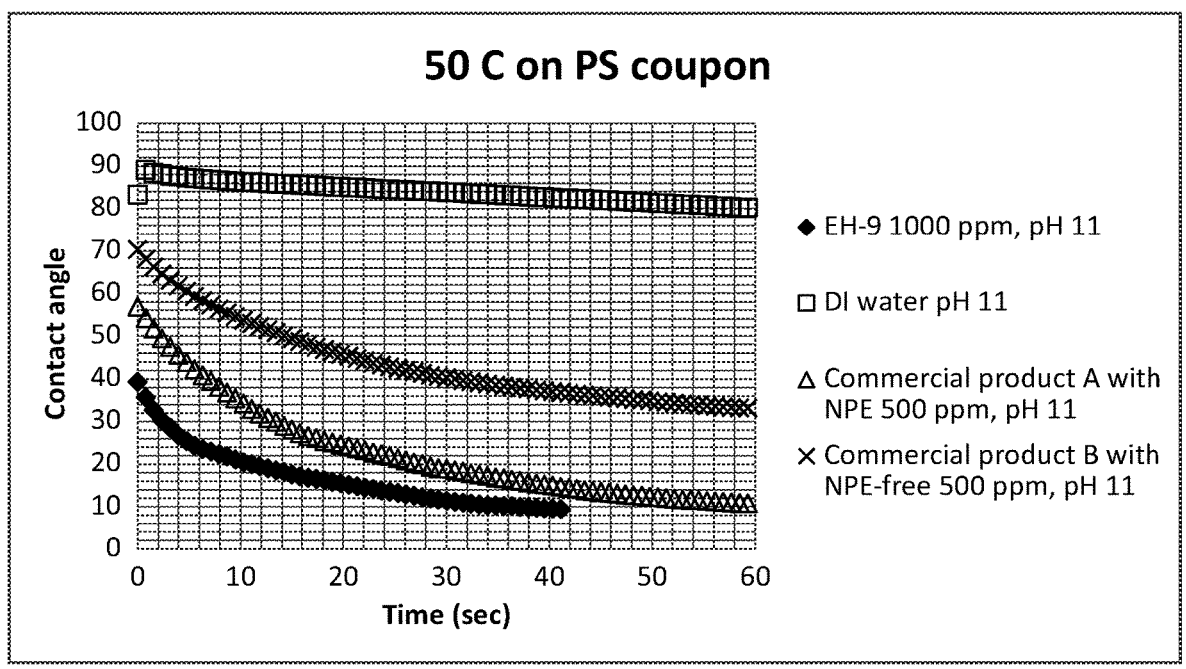
FIG. 4 is a graph of contact angle measured at 50° C. over time for EH 9 surfactant, DI water, NPE and amine oxide.
Figure 5:
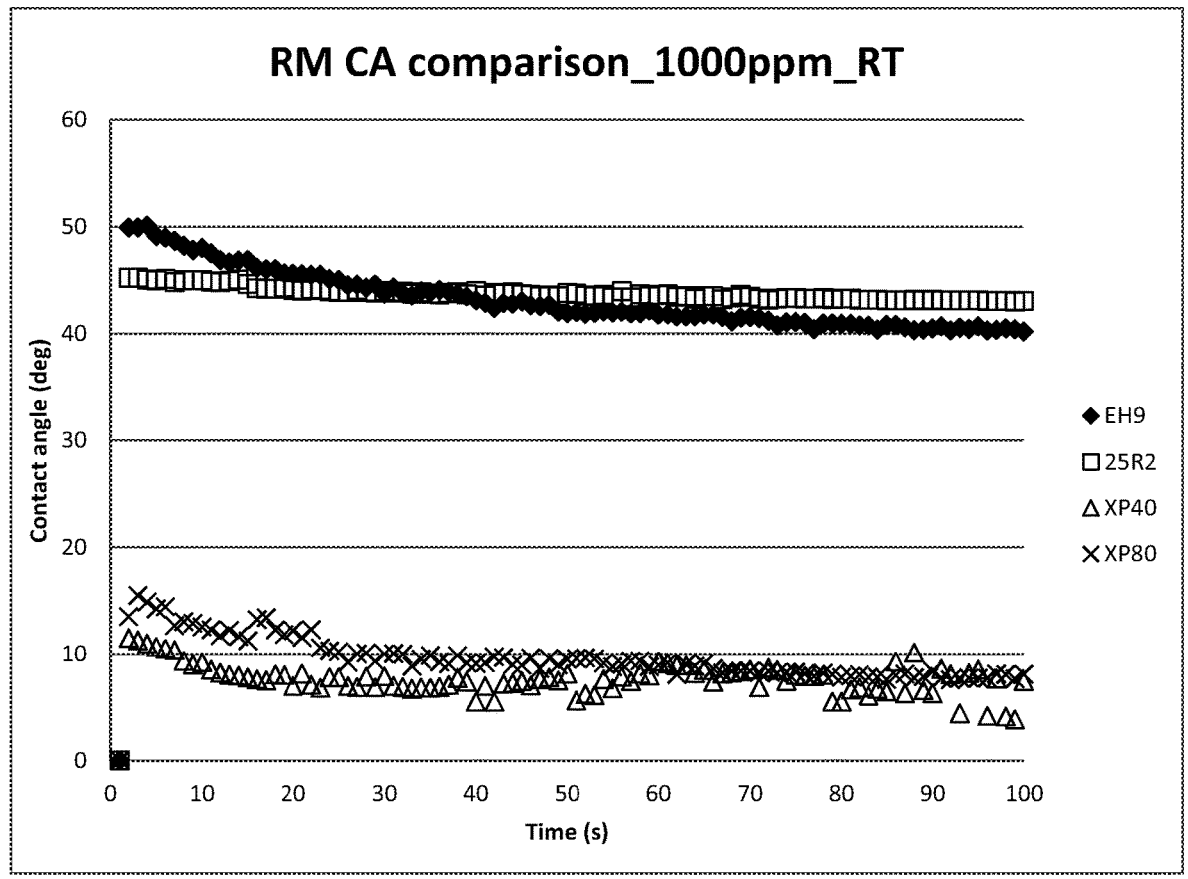
FIG. 5 is a graph of contact angle for the surfactants EH9, 25R2, XP40 and XP 80 at room temperature.
Figure 6:
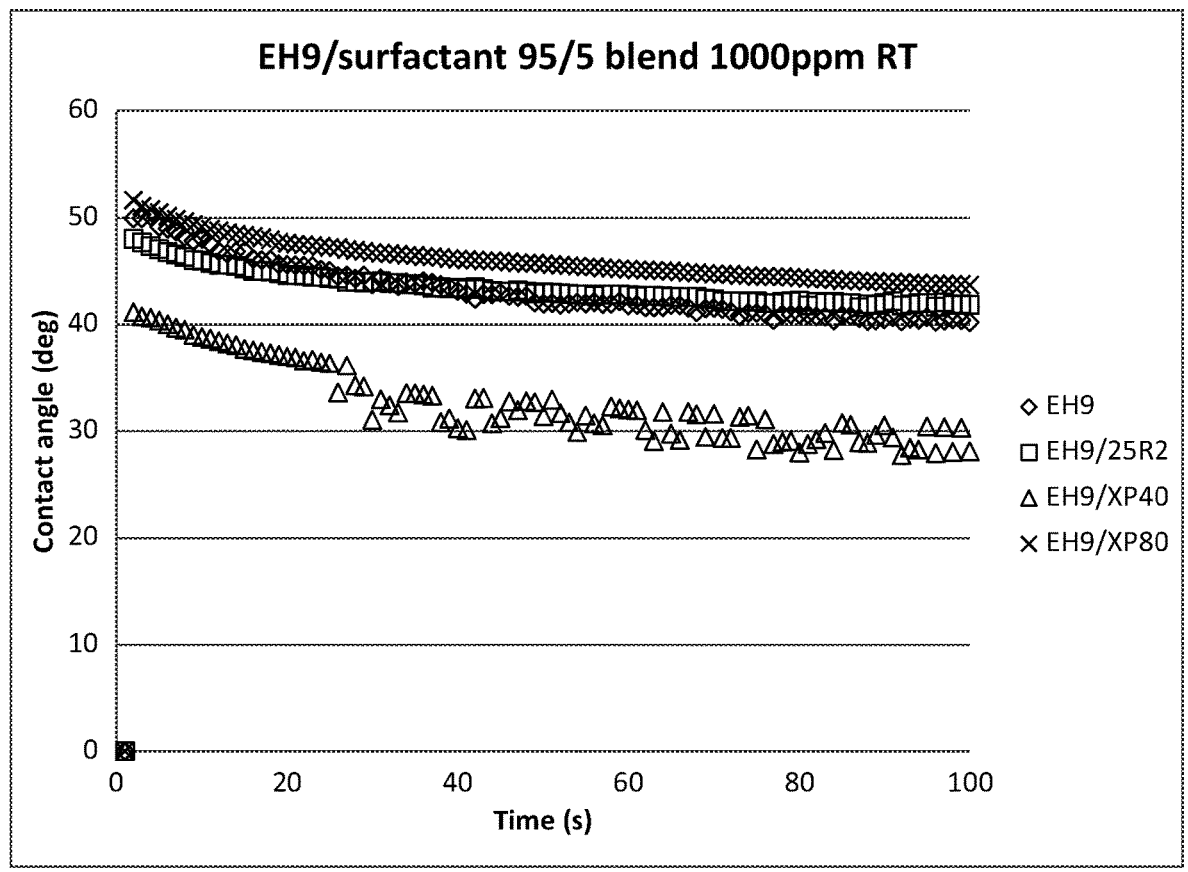
FIG. 6 is a graph of contact angle for the surfactants EH9, EH9/25R2, EH9/XP40 and EH9/XP80 at 95/5 blend at room temperature.
Figure 7:
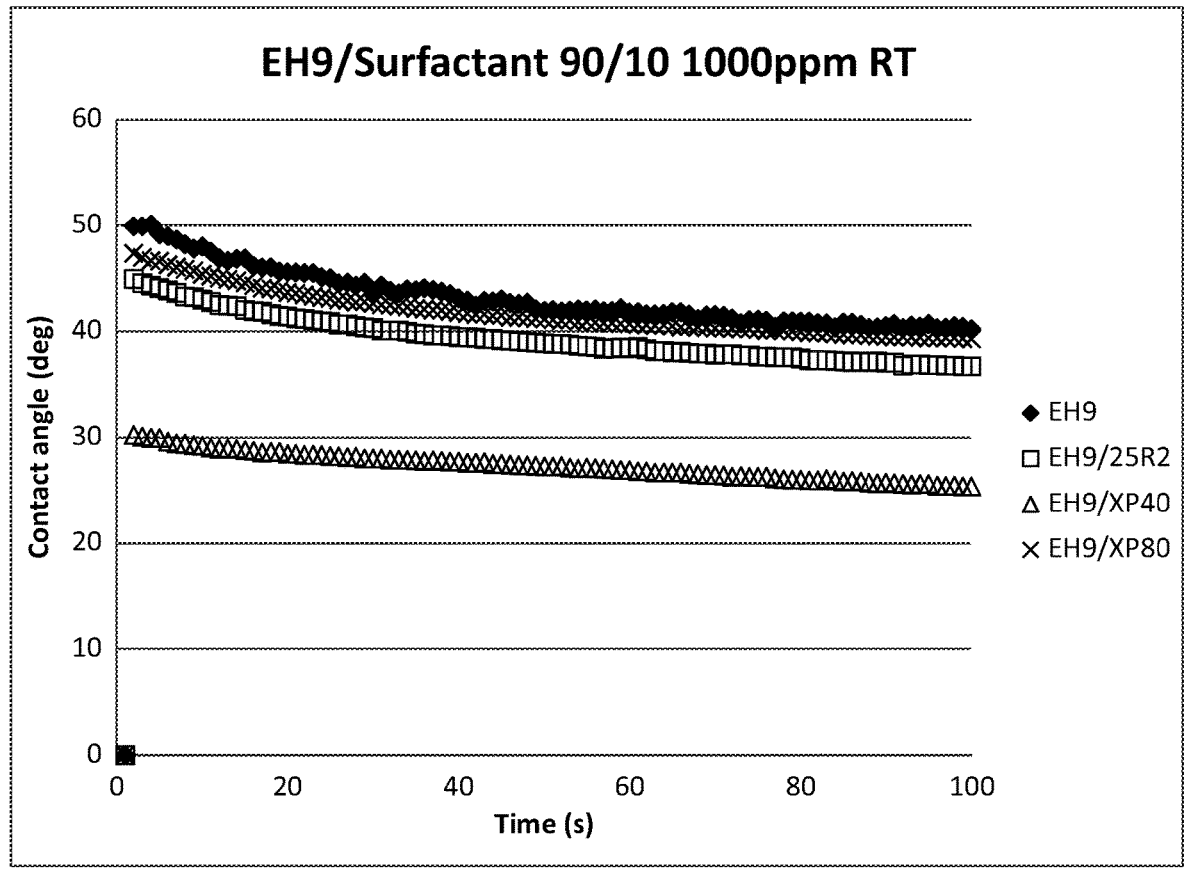
FIG. 7 is a graph of contact angle for the surfactants EH9, EH9/25R2, EH9/XP40 and EH9/XP80 at 90/10 blend at room temperature.
Figure 8:
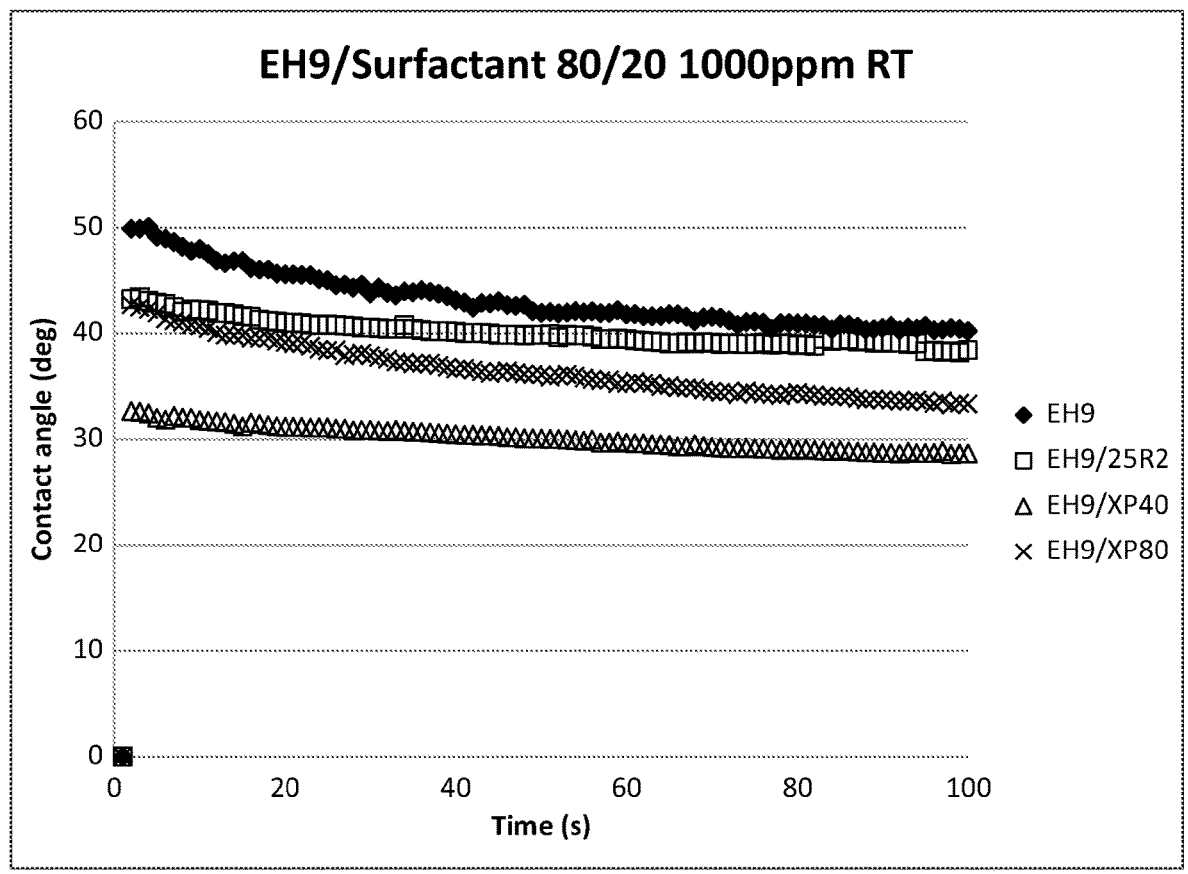
FIG. 8 is a graph of contact angle for the surfactants EH9, EH9/25R2, EH9/XP40 and EH9/XP80 at 80/20 blend at room temperature.
Figure 9:
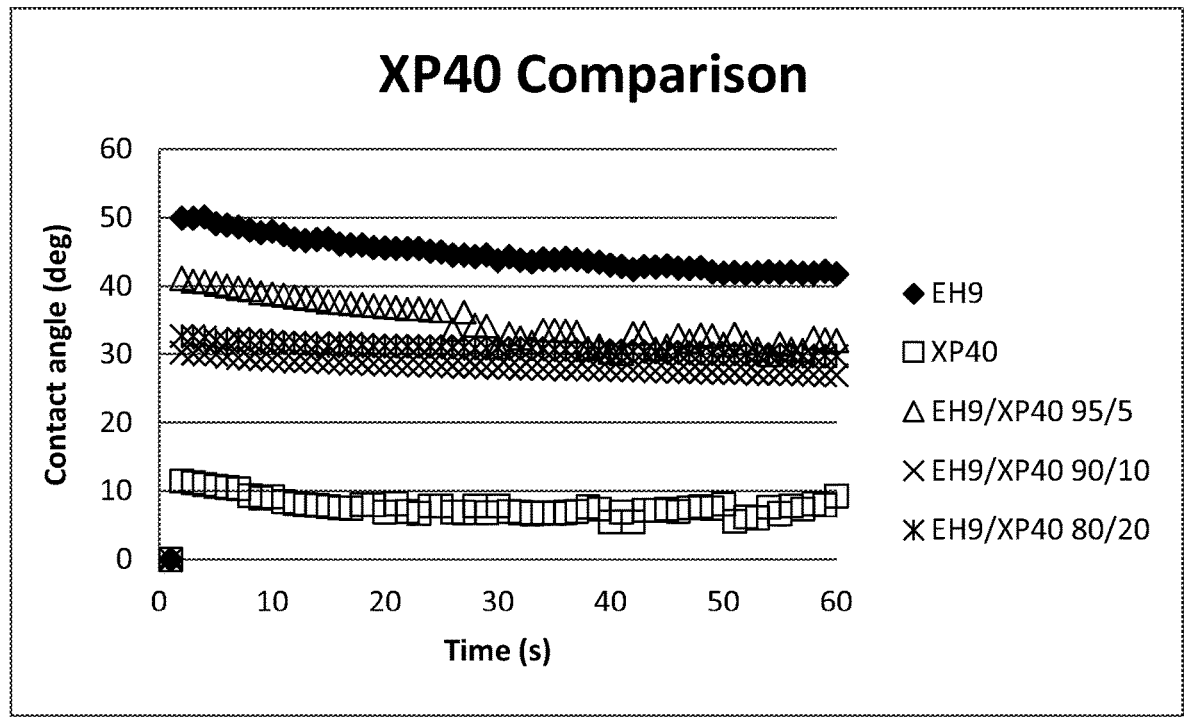
FIG. 9 is a contact angle comparison of EH9 and XP40 blends on polysulfone coupon at room temperature.

The lower contact angle means the solution can wet the surface well. FIG. 4 and show the contact angle measurement of Commercially available membrane cleaning product with NPE, Commercially available cleaning product with cocoamine oxide and EH 9. The results show that EH 9 and NPE containing commercial composition can wet PS coupon much faster than cocaine oxide composition and water. EH9 and the NPE compositions are best at removing butterfat from the PS coupon.

Example 4

Blend Testing

Different surfactants were tested in combination with the EH extended surfactants to see if any synergies were present.

Lutensol TO5 is a saturated iso-C13alcohol available from BASF
Surfynol is a nonionic polyoxyethylene substituted acetylene glycol surfactant commercially available from Evonik Industries
Dynol 604 and Dynal 360 are Gemini surfactants available from Air Products.

Stability data was also tested and is listed in Table C below.

TABLE C

| Blend | separated (RT, 7 days) | Freeze thaw (4 cycles) |
| --- | --- | --- |
| EH9/TO5 90/10 | Y | Y |
| EH9/TO5 70/30 | Y | Y |
| EH9/TO5 50/50 | Y | Y |
| EH9 | N | N |
| TO5 | N | N |
| EH9/Surf 440 90/10 | Y | Y |
| EH9/Surf 440 60/40 | N | Y |
| EH9/Dyn 604 90/10 | Y | Y |
| EH9/Dyn 604 60/40 | N | Y |
| EH9/Dyn 360 90/10 | N | Y |
| EH9/Dyn 360 60/40 | Y | Y |

Although a few blends were stable at room temp after 7 days, none were stable after 4 freeze thaw cycles Initial raw material comparisons were done to see how the other 3 surfactants behave in comparison to EH9 for contact angle. The results are shown in FIGS. 5-9. From the graphs, we can see that EH9/XP40 blends had shown the most promise in wettability. The blends were tested form stability date and the results are shown in Table C.

Figure 10:
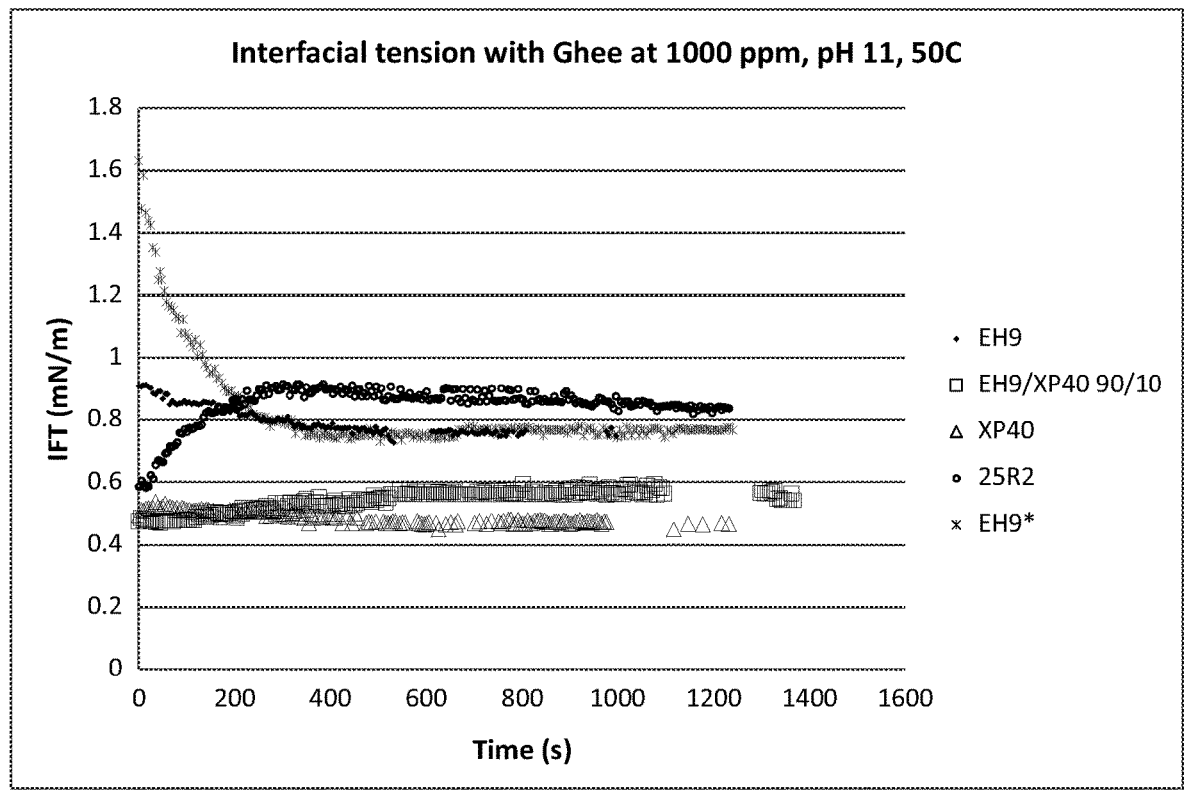
FIG. 10 is an interfacial tension against ghee of surfactants at 1000 ppm, pH 11, and 50° C.

Next IFT was measured for Ecosurf EH9, Lutensol XP40 (Guerbet alcohol ethoxylate) Pluronic (inverse EO/PO block copolymer 25R2, and EH9/XP40 blend to compare how they may emulsify butterfat. From FIG. 10 we can see that the EH9/XP40 blend will be a better cleaning surfactant due to its superior wetting ability and lower interfacial tension with ghee.

Figure 11:
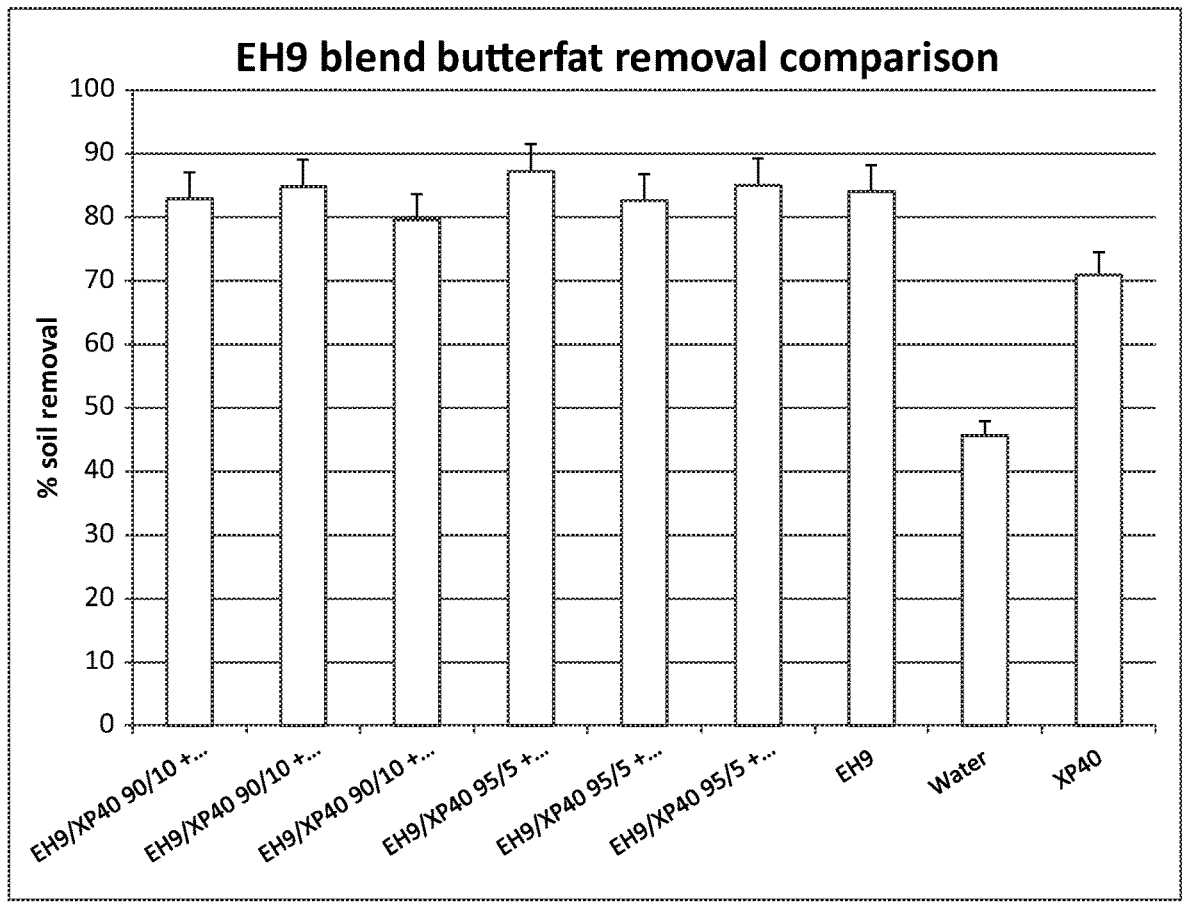
FIG. 11 is a graph of butterfat removal of various EH9/XP40 blends.

Next butterfat removal was tested. The butterfat removal data in FIG. 11 shows that there is no statistical difference between the cleaning ability of EH9 and any of the surfactant blends with XP40.

From the data, so far one can see that the removal of butterfat from the membrane is a combination of wettability, emulsification, and cloud point for nonionic ethoxylate surfactants. Although no statistical difference between EH9 and XP40 cleaning can be seen in the current data, it has been observed that XP40 does not remove butterfat soil as effectively as EH9 at the conditions of 1000 ppm, pH11, and 50 C. This provides evidence that cleaning below the cloud point is critical in butterfat removal.

Example 5

In general practice, the cleaning of membrane for dairy plants by a surfactant solution is carried out at cleaning temperature of 50° C. and pH of 11. The data has shown that the combination of a cloud point of nonionic surfactant solution slightly above the cleaning temperature, a low interfacial tension against butter fat, and a low contact against membrane materials are needed to achieve overall fat soil removal on the membrane. The combination of these traits allows the surfactant to be most effective at cleaning butterfat soils from membrane systems.

The contact angle was measured on polysulfone coupon at room temperature as the surfactants used in our study could reach the cloud point and separate out from the solution. Polysulfone was chosen as it is used mostly as a material for membrane in dairy plants. A low contact angle means the surfactant will spread more easily on the membrane and help to lift the butter soil off of the membrane, high contact angles mean the surfactant is not able to effectively spread on the membrane and comes in less contact with the butterfat soils.

The nonionic surfactant system used in our cleaning formula exhibits cloud point phenomena where it will remain surface active and miscible in aqueous solution at the temperature below the cloud point. At a temperature above the cloud point, the nonionic surfactant in the cleaning solution separates out as a coacervate phase or oil phase and loses its surface active properties. The oily phase combining with the oily soil can lead to higher soil loads and become more difficult to remove as they have strong attachment on the membrane which is mostly hydrophobic. A low interfacial tension (IFT) value with butterfat means the surfactant is able to effectively emulsify butterfat, reducing redepositing on the membrane system.

In comparing surfactants, it was found that Ecosurf EH9 possessed all of the favorable butterfat removal traits. It had a low contact angle on polysulfone, a cloud point above 50° C., and a low IFT against ghee or clarified butter fat. In comparing against other surfactants it was found that no others possessed all 3 favorable traits. Ecosurf EH6 has a comparable contact angle to EH9, a cloud point close to but still lower than 50° C., and a higher IFT value than EH9. Thus, it was expected it would have a lower percentage of butterfat removal, which is what was found. Ecosurf EH-3, with an even lower cloud point, was also shown to be worse than EH6, also giving rise to the importance of cloud point with butterfat removal. Surfonic X-AES has no cloud point as it is an anionic surfactant and a lower IFT value than EH9, leading one to believe it may outperform on butterfat removal in comparison to EH9 but it has a much higher contact angle on polysulfone. With a high contact angle on the membrane, the surfactant may not be able to adequately reach enough of the butterfat soil to effectively remove it from the membrane. See Table D.

TABLE D

Butterfat removal percentage next to the cloud point of each surfactant, run at 1000 ppm, pH11

| Chemistry | Butterfat removal (%) | cloud point (C. °)* |
| --- | --- | --- |
| EH9 | 88.6 | 49.00 |
| EH3 | 43.50 | 12.67 |
| EH6 | 52.5 | 40.00 |
| SLF-180 | 26.65 | 23.22 |
| Pluronic 25R4 | 57.14 | 41.42 |
| Surfonic X-AES | 20.32 | none |
| Dehypon LS-36 | 19.37 | 12.00 |
| Plurafac LF500 | 32.05 | 32 (5 g of surfactant in 25 g of diethylene glycol monobutyl ether solution (C = 250 g/L)) |

*1 g of surfactant in 100 g of DI water.

Example 6

Butterfat Removal Tests

Pluronic 25R2: Polyoxypropylene polyoxyethylene block (reverse)

Plurifac LF-500: alcohol ethoxylate propoxylate

Dehypon E127: Fatty alcohol alkoxylate

SLf-18B45: alcohol alkoxylate

Novel 111012-GB-21: alcohol ethoxylate C10-12, 21EO

Butterfat removal tests were run on numerous different surfactants on polysulfone Coupons. Each coupon was washed with a 0.50 wt % soap solution (using a saturated towel), then DI rinse and patted dry. The coupons were then dipped twice in Methanol and allowed to air dry over night before weighing on an analytical balance. Soil used was unsalted butter/approx. weights of 0.020-0.025 grams (applied to coupon using 1" foam paint brush). The beaker size=1000 ml, volume of test soln=600 ml, product test solution concentration=0.05 wt %, test soln temperature was 1200° F. The test solution pH was 11.00 (the DI water or solutions containing test product are adjusted to pH 11.00 after the solution reaches 120 F, prior to submerging coupons), the stir bar size was 5 CM, stirring speed during test=250 RPM with 10 min exposure time. The results are below in Table E.

TABLE E

| Product | coupon # | Clean coupon wt. | coupon/ soil wt (g) initial wt. | coupon/ soil wt (g) next day | soil wt (g) next day | post cleaning coupon/ soil wt (g) after drying overnight | weight soil (g) remains | % soil remains | % soil removed | % soil removed average | Product |
|---|---|---|---|---|---|---|---|---|---|---|---|
| U-01 | 1 | 3.7832 | 3.8078 | 3.8055 | 0.0223 | 3.7828 | −0.0004 | −1.79 | 101.8 | | U-01 |
| U-01 | 2 | 3.9120 | 3.9358 | 3.9328 | 0.0208 | 3.9105 | −0.0015 | −7.21 | 107.2 | | U-01 |
| U-01 | 3 | 3.8574 | 3.8830 | 3.8798 | 0.0224 | 3.8560 | −0.0014 | −6.25 | 106.3 | 105.1 | U-01 |
| DI H2O pH 11.00 | 4 | 3.9509 | 3.9784 | 3.9748 | 0.0239 | 3.9671 | 0.0162 | 67.78 | 32.2 | | DI H2O |
| DI H2O pH 11.00 | 5 | 3.9442 | 3.9681 | 3.9657 | 0.0215 | 3.9543 | 0.0101 | 46.98 | 53.0 | | DI H2O |
| DI H2O pH 11.00 | 6 | 3.8135 | 3.8388 | 3.8366 | 0.0231 | 3.8239 | 0.0104 | 45.02 | 55.0 | 46.7 | DI H2O |
| U-07 | 7 | 3.9902 | 4.0150 | 4.0121 | 0.0219 | 3.9986 | 0.0084 | 38.36 | 61.6 | | U-07 |
| U-07 | 8 | 3.8005 | 3.8282 | 3.8247 | 0.0242 | 3.8141 | 0.0136 | 56.20 | 43.8 | | U-07 |
| U-07 | 9 | 3.8715 | 3.8982 | 3.8962 | 0.0247 | 3.8820 | 0.0105 | 42.51 | 57.5 | 54.3 | U-07 |
| U-06 | 10 | 3.9624 | 3.9870 | 3.9831 | 0.0207 | 3.9718 | 0.0094 | 45.41 | 54.6 | | U-06 |
| U-06 | 11 | 3.9124 | 3.9393 | 3.9356 | 0.0232 | 3.9263 | 0.0139 | 59.91 | 40.1 | | U-06 |
| U-06 | 12 | 3.9390 | 3.9634 | 3.9605 | 0.0215 | 3.9476 | 0.0086 | 40.00 | 60.0 | 51.6 | U-06 |

Butter-Fat Removal Test 2

For this test the polysulfone coupons were conditioned by soaking in Methyl alcohol for 30 seconds, then placed in the 122° F. oven for 30 min. Soil was unsalted butter/approx. weights of 0.025-0.030 grams (applied to coupon using 1" foam paint brush) stir bar size=3.75 CM, stirring speed during test=240 RPM. Results are in Table F

TABLE F

| | | 10 min exposure time | Clean coupon wt. (g) | coupon/ soil wt (g) next day | soil wt (g) next day | post cleaning Coupon/ soil wt (g) after drying overnight | weight soil (g) remains | % soil remains | % soil removed | % removed average |
|---|---|---|---|---|---|---|---|---|---|---|
| coupon # | Product | Solution % Conc. | | | | | | | | |
| 1 | DI H2O pH 11.00 | n/a | 4.0090 | 4.0356 | 0.0266 | 4.0310 | 0.022 | 82.71 | 17.3 | |
| 2 | DI H2O pH 11.00 | n/a | 3.7219 | 3.7527 | 0.0308 | 3.7451 | 0.0232 | 75.32 | 24.7 | |
| 3 | DI H2O pH 11.00 | n/a | 4.0778 | 4.1042 | 0.0264 | 4.0997 | 0.0219 | 82.95 | 17.0 | 19.7 |
| 4 | Commercial Product A (with NPE) | 0.05% | 4.0516 | 4.0794 | 0.0278 | 4.0568 | 0.0052 | 18.71 | 81.3 | |
| 5 | Commercial Product A (with NPE) | 0.05% | 3.9602 | 3.9871 | 0.0269 | 3.9645 | 0.0043 | 15.99 | 84.0 | |
| 6 | Commercial Product A (with NPE) | 0.05% | 3.9567 | 3.9843 | 0.0276 | 3.9615 | 0.0048 | 17.39 | 82.6 | 82.6 |
| 7 | Commercial Product B (no NPE) | 0.05% | 3.8789 | 3.9059 | 0.0270 | 3.9015 | 0.0226 | 83.70 | 16.3 | |
| 8 | Commercial Product B (no NPE) | 0.05% | 3.9579 | 3.9822 | 0.0243 | 3.9742 | 0.0163 | 67.08 | 32.9 | |
| 9 | Commercial Product B (no NPE) | 0.05% | 3.7978 | 3.8259 | 0.0281 | 3.8204 | 0.0226 | 80.43 | 19.6 | 22.9 |

TABLE F-continued

| coupon # | 10 min exposure time Product | Solution % Conc. | Clean coupon wt. (g) | coupon/ soil wt (g) next day | soil wt (g) next day | post cleaning Coupon/ soil wt (g) after drying overnight | weight soil (g) remains | % soil remains | % soil removed | % removed average |
|---|---|---|---|---|---|---|---|---|---|---|
| 10 | Commercial Product B (no NPE)/ Ultrasil 84 | 0.05%/0.05% | 4.0210 | 4.0511 | 0.0301 | 4.0434 | 0.0224 | 74.42 | 25.6 | |
| 11 | Commercial Product B (no NPE)/ Ultrasil 84 | 0.05%/0.05% | 3.8333 | 3.8595 | 0.0262 | 3.8550 | 0.0217 | 82.82 | 17.2 | |
| 12 | Commercial Product B (no NPE)/ Ultrasil 84 | 0.05%/0.05% | 3.8096 | 3.8381 | 0.0285 | 3.8302 | 0.0206 | 72.28 | 27.7 | 23.5 |
| 13 | Tomadol 25-7/25-3 | 0.05%/0.05% | 3.6970 | 3.7236 | 0.0266 | 3.7187 | 0.0217 | 81.58 | 18.4 | |
| 14 | Tomadol 25-7/25-3 | 0.05%/0.05% | 3.8275 | 3.8568 | 0.0293 | 3.8416 | 0.0141 | 48.12 | 51.9 | |
| 15 | Tomadol 25-7/25-3 | 0.05%/0.05% | 3.9245 | 3.9487 | 0.0242 | 3.9436 | 0.0191 | 78.93 | 21.1 | 30.5 |
| 16 | LAS/ RM171074 | 0.10% | 3.9437 | 3.9716 | 0.0279 | 3.9646 | 0.0209 | 74.91 | 25.1 | |
| 17 | LAS/ RM171074 | 0.10% | 3.9620 | 3.9941 | 0.0321 | 3.9853 | 0.0233 | 72.59 | 27.4 | |
| 18 | LAS/ RM171074 | 0.10% | 3.7867 | 3.8157 | 0.0290 | 3.8084 | 0.0217 | 74.83 | 25.2 | 25.9 |
| 19 | *LAS/ +50 ppm Mg | 0.10% | 3.8332 | 3.8633 | 0.0301 | 3.8540 | 0.0208 | 69.10 | 30.9 | |
| 20 | *LAS/ +50 ppm Mg | 0.10% | 4.0841 | 4.1134 | 0.0293 | 4.1059 | 0.0218 | 74.40 | 25.6 | |
| 21 | *LAS/ +50 ppm Mg | 0.10% | 3.7411 | 3.7682 | 0.0271 | 3.7611 | 0.02 | 73.80 | 26.2 | 27.6 |
| 22 | **LAS/ +100 ppm Mg | 0.10% | 3.7436 | 3.7652 | 0.0216 | 3.7608 | 0.0172 | 79.63 | 20.4 | |
| 23 | **LAS/ +100 ppm Mg | 0.10% | 3.8401 | 3.8665 | 0.0264 | 3.8599 | 0.0198 | 75.00 | 25.0 | |
| 24 | **LAS/ +100 ppm Mg | 0.10% | 3.7709 | 3.8017 | 0.0308 | 3.7950 | 0.0241 | 78.25 | 21.8 | 22.4 |

*LAS/ +50 ppm Mg
 added 0.1175 grams MgCl2
  added 0.1175 grams MgCl2 × .2552 (Mg is 25.52% of MgCl2 compound)/
  600 grams volume × 100 × 10000 = 49.97 ppm Mg

**LAS/ +100 ppm Mg
  added 0.2350 grams MgCl2 × .2552 (Mg is 25.52% of MgCl2 compound)/
  600 grams volume × 100 × 10000 = 99.95 ppm Mg Tomadol 91-6: a $C_9$-$C_{11}$ alcohol ethoxylate with 6 moles EO having a cloud point of between about 47 and about 58° C., available from Air Products, located in Allentown, PA Butterfat removal Test 3 (same conditions as test 2. Table G.)

TABLE G

| coupon # | 10 min exposure time Product | Solution % Conc. | Clean coupon wt. (g) | coupon/ soil wt (g) next day | soil wt (g) next day | post cleaning coupon/ soil wt (g) after drying overnight | weight soil (g) remains | % soil remains | % soil removed | % removed average |
|---|---|---|---|---|---|---|---|---|---|---|
| 1 | DI H2O pH 11.00 | n/a | 3.6180 | 3.6432 | 0.0252 | 3.6363 | 0.0183 | 72.62 | 27.4 | |
| 2 | DI H2O pH 11.00 | n/a | 3.5339 | 3.5603 | 0.0264 | 3.5512 | 0.0173 | 65.53 | 34.5 | |
| 3 | DI H2O pH 11.00 | n/a | 3.6213 | 3.6443 | 0.0230 | 3.6369 | 0.0156 | 67.83 | 32.2 | 31.3 |
| 4 | Commercial Product A (with NPE) | 0.05% | 3.5696 | 3.5956 | 0.0260 | 3.5716 | 0.002 | 7.69 | 92.3 | |
| 5 | Commercial Product A (with NPE) | 0.05% | 3.6599 | 3.6869 | 0.0270 | 3.6614 | 0.0015 | 5.56 | 94.4 | |
| 6 | Commercial Product A (with NPE) | 0.05% | 3.4872 | 3.5111 | 0.0239 | 3.4903 | 0.0031 | 12.97 | 87.0 | 91.3 |
| 7 | LAS/RM171074 | 0.15% | 3.5257 | 3.5532 | 0.0275 | 3.5444 | 0.0187 | 68.00 | 32.0 | |
| 8 | LAS/RM171074 | 0.15% | 3.0983 | 3.1252 | 0.0269 | 3.1129 | 0.0146 | 54.28 | 45.7 | |
| 9 | LAS/RM171074 | 0.15% | 3.4814 | 3.5093 | 0.0279 | 3.4988 | 0.0174 | 62.37 | 37.6 | 38.5 |
| 10 | *LAS/+50 ppm Mg | 0.15% | 3.5876 | 3.6132 | 0.0256 | 3.6026 | 0.015 | 58.59 | 41.4 | |
| 11 | *LAS/+50 ppm Mg | 0.15% | 3.7151 | 3.7418 | 0.0267 | 3.7310 | 0.0159 | 59.55 | 40.4 | |
| 12 | *LAS/+50 ppm Mg | 0.15% | 3.4792 | 3.5022 | 0.0230 | 3.4951 | 0.0159 | 69.13 | 30.9 | 37.6 |
| 13 | **LAS/+100 ppm Mg | 0.15% | 3.5114 | 3.5386 | 0.0272 | 3.5276 | 0.0162 | 59.56 | 40.4 | |
| 14 | **LAS/+100 ppm Mg | 0.15% | 3.4931 | 3.5207 | 0.0276 | 3.5107 | 0.0176 | 63.77 | 36.2 | |
| 15 | **LAS/+100 ppm Mg | 0.15% | 3.6589 | 3.6849 | 0.0260 | 3.6787 | 0.0198 | 76.15 | 23.8 | 33.5 |
| 16 | Tomadol 1-5 | 0.10% | 3.7168 | 3.7443 | 0.0275 | 3.7340 | 0.0172 | 62.55 | 37.5 | |
| 17 | Tomadol 1-5 | 0.10% | 3.4709 | 3.4973 | 0.0264 | 3.4841 | 0.0132 | 50.00 | 50.0 | |
| 18 | Tomadol 1-5 | 0.10% | 3.7283 | 3.7573 | 0.0290 | 3.7451 | 0.0168 | 57.93 | 42.1 | 43.2 |
| 19 | Tomadol 900 | 0.10% | 3.5892 | 3.6181 | 0.0289 | 3.6028 | 0.0136 | 47.06 | 52.9 | |
| 20 | Tomadol 900 | 0.10% | 3.5843 | 3.6142 | 0.0299 | 3.6031 | 0.0188 | 62.88 | 37.1 | |
| 21 | Tomadol 900 | 0.10% | 3.4988 | 3.5257 | 0.0269 | 3.5146 | 0.0158 | 58.74 | 41.3 | 43.8 |
| 22 | Tomadol 1-9/1-5 | 0.05/0.05% | 3.5429 | 3.5700 | 0.0271 | 3.5547 | 0.0118 | 43.54 | 56.5 | |
| 23 | Tomadol 1-9/1-5 | 0.05/0.05% | 3.6919 | 3.7180 | 0.0261 | 3.7024 | 0.0105 | 40.23 | 59.8 | |
| 24 | Tomadol 1-9/1-5 | 0.05/0.05% | 3.6394 | 3.6672 | 0.0278 | 3.6503 | 0.0109 | 39.21 | 60.8 | 59.0 |

TABLE H

| | | | | | | TEST 4. | | | | |
|---|---|---|---|---|---|---|---|---|---|---|
| coupon # | 10 min exposure time Product | Solution % Conc. | Clean coupon wt. (g) | coupon/ soil wt (g) next day | soil wt (g) next day | post cleaning coupon/ soil wt (g) after drying overnight | weight soil (g) remains | % soil remains | % soil removed | % removed average |
| 1 | Lutensol XP-40 | 0.10% | 3.5063 | 3.5332 | 0.0269 | 3.5321 | 0.0258 | 95.91 | 4.1 | |
| 2 | Lutensol XP-40 | 0.10% | 3.5696 | 3.5957 | 0.0261 | 3.5887 | 0.0191 | 73.18 | 26.8 | |
| 3 | Lutensol XP-40 | 0.10% | 3.5473 | 3.5779 | 0.0306 | 3.5608 | 0.0135 | 44.12 | 55.9 | 28.9 |
| 4 | Lutensol XP-50 | 0.10% | 3.5451 | 3.5752 | 0.0301 | 3.5557 | 0.0106 | 35.22 | 64.8 | |
| 5 | Lutensol XP-50 | 0.10% | 3.5715 | 3.5985 | 0.0270 | 3.5886 | 0.0171 | 63.33 | 36.7 | |
| 6 | Lutensol XP-50 | 0.10% | 3.739 | 3.7669 | 0.0279 | 3.7548 | 0.0158 | 56.63 | 43.4 | 48.3 |
| 7 | Lutensol XP-80 | 0.10% | 3.5798 | 3.607 | 0.0272 | 3.5893 | 0.0095 | 34.93 | 65.1 | |
| 8 | Lutensol XP-80 | 0.10% | 3.4553 | 3.4839 | 0.0286 | 3.4664 | 0.0111 | 38.81 | 61.2 | |
| 9 | Lutensol XP-80 | 0.10% | 3.589 | 3.6162 | 0.0272 | 3.5999 | 0.0109 | 40.07 | 59.9 | 62.1 |
| 10 | Ultrasil 06 | 0.50% | 3.4660 | 3.4947 | 0.0287 | 3.469 | 0.003 | 10.45 | 89.5 | |
| 11 | Ultrasil 06 | 0.50% | 3.166 | 3.1952 | 0.0292 | 3.1704 | 0.0044 | 15.07 | 84.9 | |
| 12 | Ultrasil 06 | 0.50% | 3.4731 | 3.5011 | 0.0280 | 3.4802 | 0.0071 | 25.36 | 74.6 | 83.0 |
| 13 | Ultrasil 07 | 0.23% | 3.1993 | 3.2222 | 0.0229 | 3.2095 | 0.0102 | 44.54 | 55.5 | |

TABLE H-continued

TEST 4.

| | | | | | | | | | | |
|---|---|---|---|---|---|---|---|---|---|---|
| 14 | Ultrasil 07 | 0.23% | 3.7403 | 3.7676 | 0.0273 | 3.7538 | 0.0135 | 49.45 | 50.5 | |
| 15 | Ultrasil 07 | 0.23% | 3.7703 | 3.799 | 0.0287 | 3.7777 | 0.0074 | 25.78 | 74.2 | 60.1 |
| 16 | Dehypon LS-54 | 0.10% | 3.6678 | 3.6943 | 0.0265 | 3.6913 | 0.0235 | 88.68 | 11.3 | |
| 17 | Dehypon LS-54 | 0.10% | 3.5606 | 3.5896 | 0.0290 | 3.5853 | 0.0247 | 85.17 | 14.8 | |
| 18 | Dehypon LS-54 | 0.10% | 3.5421 | 3.5693 | 0.0272 | 3.5644 | 0.0223 | 81.99 | 18.0 | 14.7 |
| 19 | Commercial PRoduct A (with NPE) | 0.05% | 3.4853 | 3.5115 | 0.0262 | 3.4864 | 0.0011 | 4.20 | 95.8 | |
| 20 | Commercial PRoduct A (with NPE) | 0.05% | 3.7445 | 3.7714 | 0.0269 | 3.7446 | 0.0001 | 0.37 | 99.6 | |
| 21 | Commercial PRoduct A (with NPE) | 0.05% | 3.6157 | 3.6441 | 0.0284 | 3.617 | 0.0013 | 4.58 | 95.4 | 97.0 |
| 22 | DI water pH 11.00 | n/a | 3.1461 | 3.1723 | 0.0262 | 3.1624 | 0.0163 | 62.21 | 37.8 | |
| 23 | DI water pH 11.00 | n/a | 3.5516 | 3.5778 | 0.0262 | 3.5665 | 0.0149 | 56.87 | 43.1 | |
| 24 | DI water pH 11.00 | n/a | 3.6628 | 3.6904 | 0.0276 | 3.6818 | 0.019 | 68.84 | 31.2 | 37.4 |

| coupon # | Product | Solution % Conc. | Clean coupon wt. | coupon/ soil wt next day | soil wt next day | post cleaning coupon/ soil wt after drying overnight | weight soil remains | % soil remains | % soil removed | % removed average |
|---|---|---|---|---|---|---|---|---|---|---|
| 25 | Ethyl Hexyl Sulfate 40% | 0.25% | 3.5066 | 3.5333 | 0.0267 | 3.5214 | 0.0148 | 55.43 | 44.6 | |
| 26 | Ethyl Hexyl Sulfate 40% | 0.25% | 3.5434 | 3.5703 | 0.0269 | 3.5593 | 0.0159 | 59.11 | 40.9 | |
| 27 | Ethyl Hexyl Sulfate 40% | 0.25% | 3.1386 | 3.1653 | 0.0267 | 3.1524 | 0.0138 | 51.69 | 48.3 | 44.6 |
| 28 | Tomadol 1-9/1-3 | .05%/ .05% | 3.6716 | 3.6985 | 0.0269 | 3.6824 | 0.0108 | 40.15 | 59.9 | |
| 29 | Tomadol 1-9/1-3 | .05%/ .05% | 3.6149 | 3.6428 | 0.0279 | 3.629 | 0.0141 | 50.54 | 49.5 | |
| 30 | Tomadol 1-9/1-3 | .05%/ .05% | 3.6709 | 3.6977 | 0.0268 | 3.6865 | 0.0156 | 58.21 | 41.8 | 50.4 |
| 31 | Pluafac LF-900 | 0.10% | 3.1367 | 3.1637 | 0.0270 | 3.1589 | 0.0222 | 82.22 | 17.8 | |
| 32 | Pluafac LF-900 | 0.10% | 3.6801 | 3.7071 | 0.0270 | 3.7028 | 0.0227 | 84.07 | 15.9 | |
| 33 | Pluafac LF-900 | 0.10% | 3.5249 | 3.5506 | 0.0257 | 3.5459 | 0.021 | 81.71 | 18.3 | 17.3 |
| 34 | Tomadol 25-7/25-3 | .075%/ .025% | 3.6182 | 3.6468 | 0.0286 | 3.6286 | 0.0104 | 36.36 | 63.6 | |
| 35 | Tomadol 25-7/25-3 | .075%/ .025% | 3.523 | 3.5511 | 0.0281 | 3.5412 | 0.0182 | 64.77 | 35.2 | |
| 36 | Tomadol 25-7/25-3 | .075%/ .025% | 3.4583 | 3.4841 | 0.0258 | 3.4738 | 0.0155 | 60.08 | 39.9 | 46.3 |

Examples of suitable nonionic surfactants include alkoxylated surfactants, such as Dehypon LS-54 (R-(EO)$_5$(PO)$_4$) and Dehypon LS-36 (R-(EO)$_3$(PO)$_6$); and capped alcohol alkoxylates, such as Plurafac LF221 and Genepol from Clariant, Tegoten EC11; mixtures thereof, or the like.))
Butter-Fat removal test 5 Table I.

TABLE I

| coupon # | 10 min exposure time Product | Solution % Conc. | Clean coupon wt. (g) | coupon/ soil wt (g) next day | soil wt (g) next day | post cleaning coupon/ soil wt (g) after drying overnight | weight soil remains | % soil remains | % soil removed | % removed average |
|---|---|---|---|---|---|---|---|---|---|---|
| 1 | DI water pH 11.00 | n/a | 3.9053 | 3.9325 | 0.0272 | 3.9219 | 0.0166 | 61.03 | 39.0 | |
| 2 | DI water pH 11.00 | n/a | 3.8796 | 3.9074 | 0.0278 | 3.8977 | 0.0181 | 65.11 | 34.9 | |
| 3 | DI water pH 11.00 | n/a | 3.8071 | 3.8351 | 0.0280 | 3.8245 | 0.0174 | 62.14 | 37.9 | 37.2 |

TABLE I-continued

| | | | Clean coupon wt. | coupon/soil wt next day | soil wt next day | post cleaning coupon/soil wt after drying overnight | weight soil remains | % soil remains | % soil removed | % removed average |
|---|---|---|---|---|---|---|---|---|---|---|
| 4 | Commercial PRoduct A (with NPE) | 0.05% | 3.9441 | 3.9718 | 0.0277 | 3.9462 | 0.0021 | 7.58 | 92.4 | |
| 5 | Commercial PRoduct A (with NPE) | 0.05% | 3.9811 | 4.0104 | 0.0293 | 3.9838 | 0.0027 | 9.22 | 90.8 | |
| 6 | Commercial PRoduct A (with NPE) | 0.05% | 3.9515 | 3.9793 | 0.0278 | 3.9546 | 0.0031 | 11.15 | 88.8 | 90.7 |
| 7 | Avanel S 150 CGN (as is) | 0.10% | 3.9129 | 3.9390 | 0.0261 | 3.9295 | 0.0166 | 63.60 | 36.4 | |
| 8 | Avanel S 150 CGN (as is) | 0.10% | 3.8718 | 3.9009 | 0.0291 | 3.8901 | 0.0183 | 62.89 | 37.1 | |
| 9 | Avanel S 150 CGN (as is) | 0.10% | 3.8553 | 3.8843 | 0.0290 | 3.8740 | 0.0187 | 64.48 | 35.5 | 36.3 |
| 10 | Ultrasil 07 | 0.23% | 3.7815 | 3.8088 | 0.0273 | 3.7930 | 0.0115 | 42.12 | 57.9 | |
| 11 | Ultrasil 07 | 0.23% | 3.9582 | 3.9865 | 0.0283 | 3.9701 | 0.0119 | 42.05 | 58.0 | |
| 12 | Ultrasil 07 | 0.23% | 3.8012 | 3.8288 | 0.0276 | 3.8154 | 0.0142 | 51.45 | 48.6 | 54.8 |
| 13 | Ultrasil 07 (130 F.) | 0.23% | 3.7583 | 3.7883 | 0.0300 | 3.7688 | 0.0105 | 35.00 | 65.0 | |
| 14 | Ultrasil 07 (130 F.) | 0.23% | 3.8024 | 3.8315 | 0.0291 | 3.8167 | 0.0143 | 49.14 | 50.9 | |
| 15 | Ultrasil 07 (130 F.) | 0.23% | 3.9351 | 3.9625 | 0.0274 | 3.9497 | 0.0146 | 53.28 | 46.7 | 54.2 |
| 16 | Ultrasil 07 (2X cleaning) | 0.23% | 3.8091 | 3.8385 | 0.0294 | 3.8175 | 0.0084 | 28.57 | 71.4 | |
| 17 | Ultrasil 07 (2X cleaning) | 0.23% | 3.9522 | 3.9801 | 0.0279 | 3.9563 | 0.0041 | 14.70 | 85.3 | |
| 18 | Ultrasil 07 (2X cleaning) | 0.23% | 3.9541 | 3.9816 | 0.0275 | 3.9596 | 0.0055 | 20.00 | 80.0 | 78.9 |
| 19 | Lutensol TDA-9/TDA-3 | .05%/.05% | 3.8701 | 3.9002 | 0.0301 | 3.8901 | 0.0200 | 66.45 | 33.6 | |
| 20 | Lutensol TDA-9/TDA-3 | .05%/.05% | 3.9890 | 4.0101 | 0.0211 | 4.0031 | 0.0141 | 66.82 | 33.2 | |
| 21 | Lutensol TDA-9/TDA-3 | .05%/.05% | 3.9584 | 3.9874 | 0.0290 | 3.9802 | 0.0218 | 75.17 | 24.8 | 30.5 |
| 22 | Ethyl hexyl sulfate/C12amine oxide | 120 ppm/100 ppm | 3.7951 | 3.8244 | 0.0293 | 3.8093 | 0.0142 | 48.46 | 51.5 | |
| 23 | Ethyl hexyl sulfate/C12amine oxide | 120 ppm/100 ppm | 3.7150 | 3.7424 | 0.0274 | 3.7307 | 0.0157 | 57.30 | 42.7 | |
| 24 | Ethyl hexyl sulfate/C12amine oxide | 120 ppm/100 ppm | 3.7803 | 3.8101 | 0.0298 | 3.7928 | 0.0125 | 41.95 | 58.1 | 50.8 |

| coupon # | Product | Solution % Conc. | Clean coupon wt. | coupon/soil wt next day | soil wt next day | post cleaning coupon/soil wt after drying overnight | weight soil remains | % soil remains | % soil removed | % removed average |
|---|---|---|---|---|---|---|---|---|---|---|
| 25 | Ecosurf EH-9 | 0.10% | 3.9776 | 4.0045 | 0.0269 | 3.9803 | 0.0027 | 10.04 | 90.0 | |
| 26 | Ecosurf EH-9 | 0.10% | 3.9512 | 3.9789 | 0.0277 | 3.9538 | 0.0026 | 9.39 | 90.6 | |
| 27 | Ecosurf EH-9 | 0.10% | 3.7896 | 3.8167 | 0.0271 | 3.7947 | 0.0051 | 18.82 | 81.2 | 87.3 |
| 28 | Ecosurf SA-9 | 0.10% | 3.7420 | 3.7699 | 0.0279 | 3.7499 | 0.0079 | 28.32 | 71.7 | |
| 29 | Ecosurf SA-9 | 0.10% | 3.9414 | 3.9691 | 0.0277 | 3.9502 | 0.0088 | 31.77 | 68.2 | |
| 30 | Ecosurf SA-9 | 0.10% | 3.8733 | 3.9007 | 0.0274 | 3.8852 | 0.0119 | 43.43 | 56.6 | 65.5 |
| 31 | Ecosurf EH-3 | 0.10% | 3.7567 | 3.7852 | 0.0285 | 3.7737 | 0.017 | 59.65 | 40.4 | |
| 32 | Ecosurf EH-3 | 0.10% | 3.8898 | 3.9177 | 0.0279 | 3.9055 | 0.0157 | 56.27 | 43.7 | |
| 33 | Ecosurf EH-3 | 0.10% | 3.8522 | 3.8804 | 0.0282 | 3.8673 | 0.0151 | 53.55 | 46.5 | 43.5 |
| 34 | Ecosurf EH-3/EH-9 | .05%/.05% | 3.8681 | 3.8958 | 0.0277 | 3.8849 | 0.0168 | 60.65 | 39.4 | |
| 35 | Ecosurf EH-3/EH-9 | .05%/.05% | 3.8969 | 3.9259 | 0.0290 | 3.9101 | 0.0132 | 45.52 | 54.5 | |
| 36 | Ecosurf EH-3/EH-9 | .05%/.05% | 3.9108 | 3.9388 | 0.0280 | 3.9279 | 0.0171 | 61.07 | 38.9 | 44.3 |
| 37 | Quadexx 400 | 0.10% | 3.7685 | 3.7992 | 0.0307 | 3.7885 | 0.02 | 65.15 | 34.9 | |
| 38 | Quadexx 400 | 0.10% | 3.9152 | 3.9442 | 0.0290 | 3.9356 | 0.0204 | 70.34 | 29.7 | |
| 39 | Quadexx 400 | 0.10% | 3.8149 | 3.8448 | 0.0299 | 3.8385 | 0.0236 | 78.93 | 21.1 | 28.5 |

AVANEL S-150 CG C12-C15 alkyl 15 moles of EO
Quadexx 400 is a c6 to c10 EO PO alcohol surfactant Butter-Fat Removal Test 6

TABLE J

| coupon | 10 min exposure time Product | Pdt. activity | total PPM actives in test solution | Clean coupon wt. (g) | coupon/ soil wt (g) next day | soil wt (g) next day | post cleaning coupon/ soil wt (g) after drying overnight | weight soil (g) remains | % soil remains | % soil removed | % removed average |
|---|---|---|---|---|---|---|---|---|---|---|---|
| 1 | Genapol B2 | 100% | 1000 ppm | 3.5055 | 3.5328 | 0.0273 | 3.5269 | 0.0214 | 78.39 | 21.6 | |
| 2 | Genapol B2 | 100% | 1000 ppm | 3.5603 | 3.5897 | 0.0294 | 3.5800 | 0.0197 | 67.01 | 33.0 | |
| 3 | Genapol B2 | 100% | 1000 ppm | 3.5144 | 3.5403 | 0.0259 | 3.5348 | 0.0204 | 78.76 | 21.2 | 25.3 |
| 4 | Genapol EP 2454 | 100% | 1000 ppm | 3.6722 | 3.7002 | 0.0280 | 3.6978 | 0.0256 | 91.43 | 8.6 | |
| 5 | Genapol EP 2454 | 100% | 1000 ppm | 3.6370 | 3.6647 | 0.0277 | 3.6590 | 0.022 | 79.42 | 20.6 | |
| 6 | Genapol EP 2454 | 100% | 1000 ppm | 3.5273 | 3.5547 | 0.0274 | 3.5524 | 0.0251 | 91.61 | 8.4 | 12.5 |
| 7 | Berol 840 | 100% | 1000 ppm | 3.6627 | 3.6915 | 0.0288 | 3.6878 | 0.0251 | 87.15 | 12.8 | |
| 8 | Berol 840 | 100% | 1000 ppm | 3.5293 | 3.5585 | 0.0292 | 3.5562 | 0.0269 | 92.12 | 7.9 | |
| 9 | Berol 840 | 100% | 1000 ppm | 3.5769 | 3.6055 | 0.0286 | 3.6043 | 0.0274 | 95.80 | 4.2 | 8.3 |
| 10 | Bioterge PAS-8S | 38% | 1000 ppm | 3.6692 | 3.6967 | 0.0275 | 3.6858 | 0.0166 | 60.36 | 39.6 | |
| 11 | Bioterge PAS-8S | 38% | 1000 ppm | 3.6307 | 3.6586 | 0.0279 | 3.6497 | 0.019 | 68.10 | 31.9 | |
| 12 | Bioterge PAS-8S | 38% | 1000 ppm | 3.5754 | 3.6040 | 0.0286 | 3.5892 | 0.0138 | 48.25 | 51.7 | 41.1 |
| 13 | Ecosurf EH-9 | 100% | 1000 ppm | 3.6388 | 3.6671 | 0.0283 | 3.6395 | 0.0007 | 2.47 | 97.5 | |
| 14 | Ecosurf EH-9 | 100% | 1000 ppm | 3.5044 | 3.5323 | 0.0279 | 3.5068 | 0.0024 | 8.60 | 91.4 | |
| 15 | Ecosurf EH-9 | 100% | 1000 ppm | 3.6048 | 3.6343 | 0.0295 | 3.6079 | 0.0031 | 10.51 | 89.5 | 92.8 |
| 16 | Ultrasil-01 | 100% | 500 ppm | 3.6033 | 3.6341 | 0.0308 | 3.6036 | 0.0003 | 0.97 | 99.0 | |
| 17 | Ultrasil-01 | 100% | 500 ppm | 3.7453 | 3.7734 | 0.0281 | 3.7466 | 0.0013 | 4.63 | 95.4 | |
| 18 | Ultrasil-01 | 100% | 500 ppm | 3.4879 | 3.5165 | 0.0286 | 3.4890 | 0.0011 | 3.85 | 96.2 | 96.9 |
| 19 | DI water pH 11.00 | n/a | n/a | 3.6092 | 3.6358 | 0.0266 | 3.6242 | 0.0150 | 56.39 | 43.6 | |
| 20 | DI water pH 11.00 | n/a | n/a | 3.6628 | 3.6932 | 0.0304 | 3.6766 | 0.0138 | 45.39 | 54.6 | |
| 21 | DI water pH 11.00 | n/a | n/a | 3.5983 | 3.6249 | 0.0266 | 3.6153 | 0.017 | 63.91 | 36.1 | 44.8 |
| 22 | Dehypon LS-54, Lutensol TO8, Lutensol TO3 | 100%, 100%, 100% | 400, 400, 200 ppm | 3.5468 | 3.5731 | 0.0263 | 3.5661 | 0.0193 | 73.38 | 26.6 | |
| 23 | Dehypon LS-54, Lutensol TO8, Lutensol TO3 | 100%, 100%, 100% | 400, 400, 200 ppm | 3.5667 | 3.5934 | 0.0267 | 3.5892 | 0.0225 | 84.27 | 15.7 | |
| 24 | Dehypon LS-54, Lutensol TO8, Lutensol TO3 | 100%, 100%, 100% | 400, 400, 200 ppm | 3.5260 | 3.5532 | 0.0272 | 3.5488 | 0.0228 | 83.82 | 16.2 | 19.5 |
| 25 | Ultrasil-02 | 0.19% | 1500 ppm | 3.5827 | 3.6093 | 0.0266 | 3.5972 | 0.0145 | 54.51 | 45.5 | |
| 26 | Ultrasil-02 | 0.19% | 1500 ppm | 3.6156 | 3.6458 | 0.0302 | 3.6332 | 0.0176 | 58.28 | 41.7 | |
| 27 | Ultrasil-02 | 0.19% | 1500 ppm | 3.7658 | 3.7946 | 0.0288 | 3.7825 | 0.0167 | 57.99 | 42.0 | 43.1 |
| 28 | Ethyl Hexyl Sulfate/ Amine Oxide | 40% 30% | 300 ppm/ 100 ppm | 3.5026 | 3.5322 | 0.0296 | 3.5196 | 0.017 | 57.43 | 42.6 | |
| 29 | Ethyl Hexyl Sulfate/ Amine Oxide | 40%, 30% | 300 ppm/ 100 ppm | 3.6935 | 3.7217 | 0.0282 | 3.7076 | 0.0141 | 50.00 | 50.0 | |

TABLE J-continued

| coupon | 10 min exposure time Product | Pdt. activity | total PPM actives in test solution | Clean coupon wt. (g) | coupon/ soil wt (g) next day | soil wt (g) next day | post cleaning coupon/ soil wt (g) after drying overnight | weight soil (g) remains | % soil remains | % soil removed | % removed average |
|---|---|---|---|---|---|---|---|---|---|---|---|
| 30 | Ethyl Hexyl Sulfate/ Amine Oxide | 40%, 30% | 300 ppm/ 100 ppm | 3.5897 | 3.6177 | 0.0280 | 3.6071 | 0.0174 | 62.14 | 37.9 | 43.5 |

Bioterg PaS 8S-Sodium caprylyl sulfonate

Butter-Fat Removal Test 7
For this test Polyvinylidene Difluoride coupons (kynar) were used. Table K.

TABLE K

| 10 min exposure time Product | Pdt. activity | total PPM actives in test solution | Clean coupon wt (g). | coupon/ soil wt (g) next day | soil wt (g) next day | post cleaning coupon/ soil wt (g) after drying overnight | weight soil remains | % soil remains | % soil removed | % removed average |
|---|---|---|---|---|---|---|---|---|---|---|
| DI water pH 11.00 | n/a | n/a | 5.5527 | 5.5791 | 0.0264 | 5.5687 | 0.0160 | 60.61 | 39.4 | |
| DI water pH 11.00 | n/a | n/a | 5.4828 | 5.5091 | 0.0263 | 5.4986 | 0.0158 | 60.08 | 39.9 | |
| DI water pH 11.00 | n/a | n/a | 5.5461 | 5.5740 | 0.0279 | 5.5598 | 0.0137 | 49.10 | 50.9 | 43.4 |
| Ultrasil-01 | 100% | 500 ppm | 5.5568 | 5.5853 | 0.0285 | 5.5568 | 0.0000 | 0.00 | 100.0 | |
| Ultrasil-01 | 100% | 500 ppm | 5.4913 | 5.5189 | 0.0276 | 5.4914 | 0.0001 | 0.36 | 99.6 | |
| Ultrasil-01 | 100% | 500 ppm | 5.4933 | 5.5209 | 0.0276 | 5.4935 | 0.0002 | 0.72 | 99.3 | 99.6 |
| Ecosurf EH-9 | 100% | 1000 ppm | 5.5471 | 5.5760 | 0.0289 | 5.5477 | 0.0006 | 2.08 | 97.9 | |
| Ecosurf EH-9 | 100% | 1000 ppm | 5.6096 | 5.6382 | 0.0286 | 5.6108 | 0.0012 | 4.20 | 95.8 | |
| Ecosurf EH-9 | 100% | 1000 ppm | 5.4500 | 5.4790 | 0.0290 | 5.4506 | 0.0006 | 2.07 | 97.9 | 97.2 |
| Ultrasil-07 | 65.5% | 1506 ppm | 5.6890 | 5.7178 | 0.0288 | 5.6930 | 0.0040 | 13.89 | 86.1 | |
| Ultrasil-07 | 65.5% | 1506 ppm | 5.4946 | 5.5233 | 0.0287 | 5.4973 | 0.0027 | 9.41 | 90.6 | |
| Ultrasil-07 | 65.5% | 1506 ppm | 5.5613 | 5.5902 | 0.0289 | 5.5658 | 0.0045 | 15.57 | 84.4 | 87.0 |

Butter Fat Removal Test 8. (Same Protocol as Test 6).

TABLE L

| coupon | 10 min exposure time Product | Pdt. activity | total PPM actives in test solution | Clean coupon wt (g). | coupon/ soil wt (g) next day | soil wt (g) next day | post cleaning coupon/ soil wt (g) after drying overnight | weight soil remains | % soil remains | % soil removed | % removed average |
|---|---|---|---|---|---|---|---|---|---|---|---|
| 1 | DI water pH 11.00 | n/a | n/a | 3.6729 | 3.7009 | 0.0280 | 3.6893 | 0.0164 | 58.57 | 41.4 | |
| 2 | DI water pH 11.00 | n/a | n/a | 3.7555 | 3.7818 | 0.0263 | 3.7727 | 0.0172 | 65.40 | 34.6 | |
| 3 | DI water pH 11.00 | n/a | n/a | 3.6215 | 3.6487 | 0.0272 | 3.6404 | 0.0189 | 69.49 | 30.5 | 35.5 |
| 4 | Ecosurf EH-9 | 100% | 500 ppm | 3.4869 | 3.5136 | 0.0267 | 3.4980 | 0.0111 | 41.57 | 58.4 | |
| 5 | Ecosurf EH-9 | 100% | 500 ppm | 3.9396 | 3.9673 | 0.0277 | 3.9486 | 0.009 | 32.49 | 67.5 | |

TABLE L-continued

| coupon | Product | Pdt. activity | total PPM actives in test solution | Clean coupon wt (g). | coupon/ soil wt (g) next day | soil wt (g) next day | post cleaning coupon/ soil wt (g) after drying overnight | weight soil remains | % soil remains | % soil removed | % removed average |
|---|---|---|---|---|---|---|---|---|---|---|---|
| 6 | Ecosurf EH-9 | 100% | 500 ppm | 3.5867 | 3.6171 | 0.0304 | 3.5965 | 0.0098 | 32.24 | 67.8 | 64.6 |
| 7 | Ecosurf EH-9 | 100% | 667 ppm | 3.6351 | 3.6629 | 0.0278 | 3.6393 | 0.0042 | 15.11 | 84.9 | |
| 8 | Ecosurf EH-9 | 100% | 667 ppm | 3.7337 | 3.7598 | 0.0261 | 3.7366 | 0.0029 | 11.11 | 88.9 | |
| 9 | Ecosurf EH-9 | 100% | 667 ppm | 3.8869 | 3.9163 | 0.0294 | 3.8932 | 0.0063 | 21.43 | 78.6 | 84.1 |
| 10 | Ecosurf EH-9 | 100% | 832 ppm | 3.6224 | 3.6527 | 0.0303 | 3.6265 | 0.0041 | 13.53 | 86.5 | |
| 11 | Ecosurf EH-9 | 100% | 832 ppm | 3.6437 | 3.6677 | 0.0240 | 3.6461 | 0.0024 | 10.00 | 90.0 | |
| 12 | Ecosurf EH-9 | 100% | 832 ppm | 3.7483 | 3.7733 | 0.0250 | 3.7511 | 0.0028 | 11.20 | 88.8 | 88.4 |
| 13 | Ecosurf EH-9 | 100% | 1000 ppm | 3.6459 | 3.6742 | 0.0283 | 3.6498 | 0.0039 | 13.78 | 86.2 | |
| 14 | Ecosurf EH-9 | 100% | 1000 ppm | 3.5915 | 3.6167 | 0.0252 | 3.594 | 0.0025 | 9.92 | 90.1 | |
| 15 | Ecosurf EH-9 | 100% | 1000 ppm | 3.5948 | 3.6214 | 0.0266 | 3.5976 | 0.0028 | 10.53 | 89.5 | 88.6 |
| 16 | Ultrasil-01 | 100% | 500 ppm | 3.6223 | 3.6534 | 0.0311 | 3.6240 | 0.0017 | 5.47 | 94.5 | |
| 17 | Ultrasil-01 | 100% | 500 ppm | 3.4770 | 3.5055 | 0.0285 | 3.4798 | 0.0028 | 9.82 | 90.2 | |
| 18 | Ultrasil-01 | 100% | 500 ppm | 3.5413 | 3.5719 | 0.0306 | 3.5434 | 0.0021 | 6.86 | 93.1 | 92.6 |
| 19 | Ultrasil-07 | 65.50% | 1506 ppm | 3.7020 | 3.7293 | 0.0273 | 3.7120 | 0.0100 | 36.63 | 63.4 | |
| 20 | Ultrasil-07 | 65.50% | 1506 ppm | 3.7090 | 3.7367 | 0.0277 | 3.7181 | 0.0091 | 32.85 | 67.1 | |
| 21 | Ultrasil-07 | 65.50% | 1506 ppm | 3.5260 | 3.5443 | 0.0183 | 3.5355 | 0.0095 | 51.91 | 48.1 | 59.5 |
| 22 | Plurafac SLF-180 | 100% | 1000 ppm | 3.5033 | 3.5322 | 0.0289 | 3.5255 | 0.0222 | 76.82 | 23.2 | |
| 23 | Plurafac SLF-180 | 100% | 1000 ppm | 3.5309 | 3.5576 | 0.0267 | 3.5553 | 0.0244 | 91.39 | 8.6 | |
| 24 | Plurafac SLF-180 | 100% | 1000 ppm | 3.6323 | 3.6597 | 0.0274 | 3.6518 | 0.0195 | 71.17 | 28.8 | 20.2 |

Butter-Fat Removal Test 9. Table M.

TABLE M

| coupon | Product | Pdt. activity | total PPM actives in test solution | Clean coupon wt (g). | coupon/ soil wt (g) next day | soil wt (g) next day | post cleaning coupon/soil wt (g) after drying overnight | weight soil remains | % soil remains | % soil removed | % removed average |
|---|---|---|---|---|---|---|---|---|---|---|---|
| 1 | DI water pH 11.00 | n/a | n/a | 3.7838 | 3.8111 | 0.0273 | 3.7954 | 0.0116 | 42.49 | 57.5 | |
| 2 | DI water pH 11.00 | n/a | n/a | 3.7624 | 3.7883 | 0.0259 | 3.7791 | 0.0167 | 64.48 | 35.5 | |
| 3 | DI water pH 11.00 | n/a | n/a | 3.7195 | 3.7468 | 0.0273 | 3.7339 | 0.0144 | 52.75 | 47.3 | 46.8 |
| 4 | Ultrasil-01 | 100% | 500 ppm | 3.9048 | 3.9322 | 0.0274 | 3.9069 | 0.0021 | 7.66 | 92.3 | |
| 5 | Ultrasil-01 | 100% | 500 ppm | 3.7983 | 3.8252 | 0.0269 | 3.8006 | 0.0023 | 8.55 | 91.4 | |
| 6 | Ultrasil-01 | 100% | 500 ppm | 3.9536 | 3.9803 | 0.0267 | 3.9561 | 0.0025 | 9.36 | 90.6 | 91.5 |
| 7 | Ecosurf EH-9 | 100% | 1000 ppm | 3.6755 | 3.7037 | 0.0282 | 3.6817 | 0.0062 | 21.99 | 78.0 | |
| 8 | Ecosurf EH-9 | 100% | 1000 ppm | 3.7724 | 3.8010 | 0.0286 | 3.7760 | 0.0036 | 12.59 | 87.4 | |
| 9 | Ecosurf EH-9 | 100% | 1000 ppm | 3.7089 | 3.7348 | 0.0259 | 3.7120 | 0.0031 | 11.97 | 88.0 | 84.5 |
| 10 | Ecosurf EH-6 | 100% | 1000 ppm | 3.9251 | 3.9516 | 0.0265 | 3.9409 | 0.0158 | 59.62 | 40.4 | |
| 11 | Ecosurf EH-6 | 100% | 1000 ppm | 3.9735 | 3.9999 | 0.0264 | 3.9888 | 0.0153 | 57.95 | 42.0 | |
| 12 | Ecosurf EH-6 | 100% | 1000 ppm | 3.9327 | 3.9592 | 0.0265 | 3.9393 | 0.0066 | 24.91 | 75.1 | 52.5 |

TABLE M-continued

| coupon | Product | Pdt. activity | 10 min exposure time total PPM actives in test solution | Clean coupon wt (g). | coupon/ soil wt (g) next day | soil wt (g) next day | post cleaning coupon/soil wt (g) after drying overnight | weight soil remains | % soil remains | % soil removed | % removed average |
|---|---|---|---|---|---|---|---|---|---|---|---|
| 13 | Ecosurf EH-14 | 90% | 1000 ppm | 3.6707 | 3.6982 | 0.0275 | 3.6753 | 0.0046 | 16.73 | 83.3 | |
| 14 | Ecosurf EH-14 | 90% | 1000 ppm | 3.7690 | 3.7944 | 0.0254 | 3.7740 | 0.005 | 19.69 | 80.3 | |
| 15 | Ecosurf EH-14 | 90% | 1000 ppm | 3.7969 | 3.8236 | 0.0267 | 3.8052 | 0.0083 | 31.09 | 68.9 | 77.5 |
| 16 | Afco 4413 | as is | 10000 ppm | 3.6526 | 3.6811 | 0.0285 | 3.6741 | 0.0215 | 75.44 | 24.6 | |
| 17 | Afco 4413 | as is | 10000 ppm | 3.7367 | 3.7630 | 0.0263 | 3.7552 | 0.0185 | 70.34 | 29.7 | |
| 18 | Afco 4413 | as is | 10000 ppm | 3.7862 | 3.8142 | 0.0280 | 3.8054 | 0.0192 | 68.57 | 31.4 | 28.5 |
| 19 | Ultrasil-110 | as is | *26800 ppm | 3.7279 | 3.7580 | 0.0301 | 3.7470 | 0.0191 | 63.46 | 36.5 | |
| 20 | Ultrasil-110 | as is | *26800 ppm | 4.0383 | 4.0686 | 0.0303 | 4.0552 | 0.0169 | 55.78 | 44.2 | |
| 21 | Ultrasil-110 | as is | *26800 ppm | 3.7950 | 3.8250 | 0.0300 | 3.8163 | 0.0213 | 71.00 | 29.0 | 36.6 |
| 22 | Primus VR 2410-486 | as is | *7200 ppm | 3.8123 | 3.8420 | 0.0297 | 3.8354 | 0.0231 | 77.78 | 22.2 | |
| 23 | Primus VR 2410-486 | as is | *7200 ppm | 4.0172 | 4.0476 | 0.0304 | 4.0427 | 0.0255 | 83.88 | 16.1 | |
| 24 | Primus VR 2410-486 | as is | *7200 ppm *pH at 11.5 | 3.8077 | 3.8376 | 0.0299 | 3.8314 | 0.0237 | 79.26 | 20.7 | 19.7 |

Afco 4413 is a commercially available membrane alkaline cleaning composition

Butter-Fat Removal Test 10

TABLE N

| 10 min exposure time Product/pH | test temp. | Pdt. activity | total PPM actives in test solution | Clean coupon wt (g). | coupon/ soil wt (g) next day | soil wt (g) next day | post cleaning coupon/ soil wt (g) after drying overnight | weight soil remains | % soil remains | % soil removed | % removed average |
|---|---|---|---|---|---|---|---|---|---|---|---|
| DI water pH 11.00 | 113 F. | n/a | n/a | 3.8824 | 3.9089 | 0.0265 | 3.8977 | 0.0153 | 57.74 | 42.3 | |
| DI water pH 11.00 | 113 F. | n/a | n/a | 3.9112 | 3.9388 | 0.0276 | 3.9253 | 0.0141 | 51.09 | 48.9 | |
| DI water pH 11.00 | 113 F. | n/a | n/a | 3.8923 | 3.9190 | 0.0267 | 3.9068 | 0.0145 | 54.31 | 45.7 | 45.6 |
| Ultrasil-01 pH 11.00 | 113 F. | 100% | 600 ppm | 3.8099 | 3.8394 | 0.0295 | 3.8127 | 0.0028 | 9.49 | 90.5 | |
| Ultrasil-01 pH 11.00 | 113 F. | 100% | 600 ppm | 3.7930 | 3.8213 | 0.0283 | 3.7959 | 0.0029 | 10.25 | 89.8 | |
| Ultrasil-01 pH 11.00 | 113 F. | 100% | 600 ppm | 3.7342 | 3.7631 | 0.0289 | 3.7372 | 0.003 | 10.38 | 89.6 | 90.0 |
| LAS acid pH 11.00 | 113 F. | 96% | 600 ppm | 3.7873 | 3.8166 | 0.0293 | 3.8072 | 0.0199 | 67.92 | 32.1 | |
| LAS acid pH 11.00 | 113 F. | 96% | 600 ppm | 3.6827 | 3.7111 | 0.0284 | 3.7017 | 0.019 | 66.90 | 33.1 | |
| LAS acid pH 11.00 | 113 F. | 96% | 600 ppm | 3.6439 | 3.6727 | 0.0288 | 3.6601 | 0.0162 | 56.25 | 43.7 | 36.3 |
| Barlox 12 pH 11.00 | 113 F. | 30% | 600 ppm | 3.9112 | 3.9395 | 0.0283 | 3.9193 | 0.0081 | 28.62 | 71.4 | |
| Barlox 12 pH 11.00 | 113 F. | 30% | 600 ppm | 3.9539 | 3.9828 | 0.0289 | 3.9644 | 0.0105 | 36.33 | 63.7 | |
| Barlox 12 pH 11.00 | 113 F. | 30% | 600 ppm | 3.7856 | 3.8132 | 0.0276 | 3.7932 | 0.0076 | 27.54 | 72.5 | 69.2 |
| VR 2410-486/blend with | 113 F. | as is | 0.03% vol/vol | 3.8912 | 3.9197 | 0.0285 | 3.9038 | 0.0126 | 44.21 | 55.8 | |

TABLE N-continued

| 10 min exposure time Product/pH | test temp. | Pdt. activity | total PPM actives in test solution | Clean coupon wt (g). | coupon/ soil wt (g) next day | soil wt (g) next day | post cleaning coupon/ soil wt (g) after drying overnight | weight soil remains | % soil remains | % soil removed | % removed average |
|---|---|---|---|---|---|---|---|---|---|---|---|
| VR 2700-99 pH = 10.35 | 6.25 min | as is | 0.15% vol/vol | 3.7904 | 3.8194 | 0.0290 | 3.8004 | 0.01 | 34.48 | 65.5 | |
| VR 2410-486 pH = 11.53 | 3.75 min | as is | 0.70% vol/vol | 3.9124 | 3.9404 | 0.0280 | 3.9265 | 0.0141 | 50.36 | 49.6 | 57.0 |
| Ultrasil-110 pH 11.20 | 113 F. | as is | 0.40% vol/vol | 3.9369 | 3.9649 | 0.0280 | 3.9532 | 0.0163 | 58.21 | 41.8 | |
| Ultrasil-110 pH 11.20 | 113 F. | as is | 0.40% vol/vol | 3.7027 | 3.7298 | 0.0271 | 3.7189 | 0.0162 | 59.78 | 40.2 | |
| Ultrasil-110 pH 11.20 | 113 F. | as is | 0.40% vol/vol | 3.7415 | 3.7695 | 0.0280 | 3.7585 | 0.017 | 60.71 | 39.3 | 40.4 |
| VR 2410-486 pH 11.70 | 113 F. | as is | 0.70% vol/vol | 3.8523 | 3.8810 | 0.0287 | 3.8699 | 0.0176 | 61.32 | 38.7 | |
| VR 2410-486 pH 11.70 | 113 F. | as is | 0.70% vol/vol | 3.6953 | 3.7247 | 0.0294 | 3.7154 | 0.0201 | 68.37 | 31.6 | |
| VR 2410-486 pH 11.70 | 113 F. | as is | 0.70% vol/vol | 3.7027 | 3.7319 | 0.0292 | 3.7223 | 0.0196 | 67.12 | 32.9 | 34.4 |
| EH-9 (10% blend) pH 10.99 | 120 F. | as is | 1000 ppm | 4.0266 | 4.0556 | 0.0290 | 4.0298 | 0.0032 | 11.03 | 89.0 | |
| EH-9 (10% blend) pH 10.99 | 120 F. | as is | 1000 ppm | 3.7628 | 3.7914 | 0.0286 | 3.7663 | 0.0035 | 12.24 | 87.8 | |
| EH-9 (10% blend) pH 10.99 | 120 F. | as is | 1000 ppm | 3.9396 | 3.9687 | 0.0291 | 3.9435 | 0.0039 | 13.40 | 86.6 | 87.8 |
| Ultrasil-02/ blended with No-LAS 90% flake pH 11.00 | 120 F. | as is | 0.05% vol/vol | 3.9527 | 3.9812 | 0.0285 | 3.9664 | 0.0137 | 48.07 | 51.9 | |
| | 120 F. | 90% | 500 ppm | 3.6345 | 3.6619 | 0.0274 | 3.6530 | 0.0185 | 67.52 | 32.5 | |
| | 120 F. | | | 3.7284 | 3.7559 | 0.0275 | 3.7448 | 0.0164 | 59.64 | 40.4 | 41.6 |
| Ultrasil-02/ blended with Ultrasil-07 pH 11.00 | 120 F. | as is | 0.05% vol/vol | 3.6293 | 3.6575 | 0.0282 | 3.6406 | 0.0113 | 40.07 | 59.9 | |
| | 120 F. | as is | 0.05% vol/vol | 3.8889 | 3.9170 | 0.0281 | 3.9069 | 0.018 | 64.06 | 35.9 | |
| | 120 F. | | | 3.8502 | 3.8777 | 0.0275 | 3.8697 | 0.0195 | 70.91 | 29.1 | 41.7 |
| Ultrasil-02 pH 11.00 | 120 F. | as is | 0.05% vol/vol | 3.7280 | 3.7544 | 0.0264 | 3.7432 | 0.0152 | 57.58 | 42.4 | |
| Ultrasil-02 pH 11.00 | 120 F. | as is | 0.05% vol/vol | 3.8515 | 3.8794 | 0.0279 | 3.8641 | 0.0126 | 45.16 | 54.8 | |
| Ultrasil-02 pH 11.00 | 120 F. | as is | 0.05% vol/vol | 3.7379 | 3.7654 | 0.0275 | 3.7526 | 0.0147 | 53.45 | 46.5 | 47.9 |

Butter-Fat Removal Test 11

TABLE O

| coupon | Product | Pdt. activity | total PPM actives in test solution | Clean coupon wt (g). | coupon/ soil wt (g) next day | soil wt (g) next day | post cleaning coupon/ soil wt (g) after drying overnight | weight soil remains | % soil remains | % soil removed | % removed average |
|---|---|---|---|---|---|---|---|---|---|---|---|
| | | | 10 min exposure time | | | | | | | | |
| 1 | DI water pH 11.00 | n/a | n/a | 3.9845 | 4.0118 | 0.0273 | 4.0050 | 0.0205 | 75.09 | 24.9 | |
| 2 | DI water pH 11.00 | n/a | n/a | 3.9817 | 4.0099 | 0.0282 | 4.0013 | 0.0196 | 69.50 | 30.5 | |

TABLE O-continued

| coupon | 10 min exposure time Product | Pdt. activity | total PPM actives in test solution | Clean coupon wt (g). | coupon/ soil wt (g) next day | soil wt (g) next day | post cleaning coupon/ soil wt (g) after drying overnight | weight soil remains | % soil remains | % soil removed | % removed average |
|---|---|---|---|---|---|---|---|---|---|---|---|
| 3 | DI water pH 11.00 | n/a | n/a | 3.9920 | 4.0194 | 0.0274 | 4.0105 | 0.0185 | 67.52 | 32.5 | 29.3 |
| 4 | Ultrasil-01 | 100% | 250 ppm | 4.0176 | 4.0464 | 0.0288 | 4.0220 | 0.0044 | 15.28 | 84.7 | |
| 5 | Ultrasil-01 | 100% | 250 ppm | 3.9806 | 4.0085 | 0.0279 | 3.9853 | 0.0047 | 16.85 | 83.2 | |
| 6 | Ultrasil-01 | 100% | 250 ppm | 3.9313 | 3.9582 | 0.0269 | 3.9338 | 0.0025 | 9.29 | 90.7 | 86.2 |
| 7 | Ultrasil-01 | 100% | 500 ppm | 3.9877 | 4.0170 | 0.0293 | 3.9903 | 0.0026 | 8.87 | 91.1 | |
| 8 | Ultrasil-01 | 100% | 500 ppm | 4.0063 | 4.0351 | 0.0288 | 4.0096 | 0.0033 | 11.46 | 88.5 | |
| 9 | Ultrasil-01 | 100% | 500 ppm | 3.9860 | 4.0134 | 0.0274 | 3.9881 | 0.0021 | 7.66 | 92.3 | 90.7 |
| 25 | Ecosurf EH-9 | 100% | 750 ppm | 3.9578 | 3.9853 | 0.0275 | 3.9651 | 0.0073 | 26.55 | 73.5 | |
| 26 | Ecosurf EH-9 | 100% | 750 ppm | 4.0320 | 4.0619 | 0.0299 | 4.0379 | 0.0059 | 19.73 | 80.3 | |
| 27 | Ecosurf EH-9 | 100% | 750 ppm | 4.0057 | 4.0332 | 0.0275 | 4.0129 | 0.0072 | 26.18 | 73.8 | 75.8 |
| 10 | Ecosurf EH-9 | 100% | 1000 ppm | 3.9560 | 3.9838 | 0.0278 | 3.9618 | 0.0058 | 20.86 | 79.1 | |
| 11 | Ecosurf EH-9 | 100% | 1000 ppm | 4.0028 | 4.0314 | 0.0286 | 4.0075 | 0.0047 | 16.43 | 83.6 | |
| 12 | Ecosurf EH-9 | 100% | 1000 ppm | 3.9830 | 4.0107 | 0.0277 | 3.9879 | 0.0049 | 17.69 | 82.3 | 81.7 |
| 13 | Ecosurf EH-9 | 100% | 1250 ppm | 3.9801 | 4.0098 | 0.0297 | 3.9831 | 0.003 | 10.10 | 89.9 | |
| 14 | Ecosurf EH-9 | 100% | 1250 ppm | 3.9450 | 3.9723 | 0.0273 | 3.9497 | 0.0047 | 17.22 | 82.8 | |
| 15 | Ecosurf EH-9 | 100% | 1250 ppm | 4.0200 | 4.0487 | 0.0287 | 4.0228 | 0.0028 | 9.76 | 90.2 | 87.6 |
| 16 | Ecosurf EH-9 | 100% | 1500 ppm | 3.9736 | 4.0015 | 0.0279 | 3.9769 | 0.0033 | 11.83 | 88.2 | |
| 17 | Ecosurf EH-9 | 100% | 1500 ppm | 3.9607 | 3.9872 | 0.0265 | 3.9677 | 0.007 | 26.42 | 73.6 | |
| 18 | Ecosurf EH-9 | 100% | 1500 ppm | 3.9558 | 3.9854 | 0.0296 | 3.9617 | 0.0059 | 19.93 | 80.1 | 80.6 |
| 19 | Ecosurf EH-9 | 100% | 1750 ppm | 4.0199 | 4.0488 | 0.0289 | 4.0216 | 0.0017 | 5.88 | 94.1 | |
| 20 | Ecosurf EH-9 | 100% | 1750 ppm | 4.0509 | 4.0789 | 0.0280 | 4.0548 | 0.0039 | 13.93 | 86.1 | |
| 21 | Ecosurf EH-9 | 100% | 1750 ppm | 3.9917 | 4.0208 | 0.0291 | 3.9966 | 0.0049 | 16.84 | 83.2 | 87.8 |
| 22 | Ecosurf EH-9 | 100% | 2000 ppm | 3.9985 | 4.0267 | 0.0282 | 4.0015 | 0.003 | 10.64 | 89.4 | |
| 23 | Ecosurf EH-9 | 100% | 2000 ppm | 3.9790 | 4.0080 | 0.0290 | 3.9845 | 0.0055 | 18.97 | 81.0 | |
| 24 | Ecosurf EH-9 | 100% | 2000 ppm | 4.0061 | 4.0337 | 0.0276 | 4.0103 | 0.0042 | 15.22 | 84.8 | 85.1 |

Butter-Fat Removal Test 12

TABLE P

| coupon | 10 min exposure time Product | Pdt. activity | total PPM actives in test solution | Clean coupon wt (g). | coupon/ soil wt (g) next day | soil wt (g) next day | post cleaning coupon/ soil wt (g) after drying overnight | weight soil remains | % soil remains | % soil removed | % removed average |
|---|---|---|---|---|---|---|---|---|---|---|---|
| 1 | EH-Blend 1 | 95.00% | 1000 ppm | 3.8989 | 3.9253 | 0.0264 | 3.9096 | 0.0107 | 40.53 | 59.5 | |
| 2 | EH-Blend 1 | 95.00% | 1000 ppm | 3.9832 | 4.0107 | 0.0275 | 3.9948 | 0.0116 | 42.18 | 57.8 | |
| 3 | EH-Blend 1 | 95.00% | 1000 ppm | 3.9905 | 4.0188 | 0.0283 | 3.9985 | 0.008 | 28.27 | 71.7 | 63.0 |
| 4 | EH-Blend 2 | 97.67% | 1000 ppm | 3.9748 | 4.0038 | 0.0290 | 3.9832 | 0.0084 | 28.97 | 71.0 | |
| 5 | EH-Blend 2 | 97.67% | 1000 ppm | 4.1164 | 4.1470 | 0.0306 | 4.1245 | 0.0081 | 26.47 | 73.5 | |
| 6 | EH-Blend 2 | 97.67% | 1000 ppm | 3.8932 | 3.9232 | 0.0300 | 3.9045 | 0.0113 | 37.67 | 62.3 | 69.0 |
| 7 | EH-Blend 3 | 92.70% | 1000 ppm | 3.9832 | 4.0123 | 0.0291 | 3.9916 | 0.0084 | 28.87 | 71.1 | |
| 8 | EH-Blend 3 | 92.70% | 1000 ppm | 3.9975 | 4.0267 | 0.0292 | 4.0074 | 0.0099 | 33.90 | 66.1 | |
| 9 | EH-Blend 3 | 92.70% | 1000 ppm | 3.9981 | 4.0264 | 0.0283 | 4.0073 | 0.0092 | 32.51 | 67.5 | 68.2 |
| 10 | EH-Blend 4 | 94.27% | 1000 ppm | 3.9625 | 3.9909 | 0.0284 | 3.9711 | 0.0086 | 30.28 | 69.7 | |

TABLE P-continued

| | | | | | | | | | | | |
|---|---|---|---|---|---|---|---|---|---|---|---|
| 11 | EH-Blend 4 | 94.27% | 1000 ppm | 3.9748 | 4.0058 | 0.0310 | 3.9849 | 0.0101 | 32.58 | 67.4 | |
| 12 | EH-Blend 4 | 94.27% | 1000 ppm | 3.9641 | 3.9944 | 0.0303 | 3.9765 | 0.0124 | 40.92 | 59.1 | 65.4 |
| 13 | EH-Blend 5 | 93.50% | 1000 ppm | 3.9581 | 3.9866 | 0.0285 | 3.9694 | 0.0113 | 39.65 | 60.4 | |
| 14 | EH-Blend 5 | 93.50% | 1000 ppm | 3.9846 | 4.0144 | 0.0298 | 3.9931 | 0.0085 | 28.52 | 71.5 | |
| 15 | EH-Blend 5 | 93.50% | 1000 ppm | 3.9848 | 4.0136 | 0.0288 | 3.9954 | 0.0106 | 36.81 | 63.2 | 65.0 |
| 16 | EH-Blend 6 (100% EH-9) | 100.0% | 1000 ppm | 3.9276 | 3.9568 | 0.0292 | 3.9357 | 0.0081 | 27.74 | 72.3 | |
| 17 | EH-Blend 6 (100% EH-9) | 100.0% | 1000 ppm | 3.9963 | 4.0255 | 0.0292 | 4.0042 | 0.0079 | 27.05 | 72.9 | |
| 18 | EH-Blend 6 (100% EH-9) | 100.0% | 1000 ppm | 3.9906 | 4.0202 | 0.0296 | 3.9972 | 0.0066 | 22.30 | 77.7 | 74.3 |
| 19 | DI water pH 11.00 | n/a | n/a | 3.9830 | 4.0130 | 0.0300 | 4.0031 | 0.0201 | 67.00 | 33.0 | |
| 20 | DI water pH 11.00 | n/a | n/a | 3.9587 | 3.9882 | 0.0295 | 3.9782 | 0.0195 | 66.10 | 33.9 | |
| 21 | DI water pH 11.00 | n/a | n/a | 3.9437 | 3.9725 | 0.0288 | 3.9620 | 0.0183 | 63.54 | 36.5 | 34.5 |
| 22 | EH-Blend 8 | 96.50% | 1000 ppm | 3.9739 | 4.0026 | 0.0287 | 3.9832 | 0.0093 | 32.40 | 67.6 | |
| 23 | EH-Blend 8 | 96.50% | 1000 ppm | 4.0239 | 4.0516 | 0.0277 | 4.0330 | 0.0091 | 32.85 | 67.1 | |
| 24 | EH-Blend 8 | 96.50% | 1000 ppm | 3.9186 | 3.9473 | 0.0287 | 3.9252 | 0.0066 | 23.00 | 77.0 | 70.6 |
| 25 | NPE-9.5 | 100% | 500 ppm | 4.0648 | 4.0968 | 0.0320 | 4.0706 | 0.0058 | 18.12 | 81.9 | |
| 26 | NPE-9.5 | 100% | 500 ppm | 3.9527 | 3.9813 | 0.0286 | 3.9588 | 0.0061 | 21.33 | 78.7 | |
| 27 | NPE-9.5 | 100% | 500 ppm | 4.0187 | 4.0468 | 0.0281 | 4.0248 | 0.0061 | 21.71 | 78.3 | 79.6 |

| Surfactants | Activity | HLB |
|---|---|---|
| Ecosurf EH-3 | 100 | 7.9 |
| Ecosurf EH-6 | 100 | 10.8 |
| Ecosurf EH-9 | 100 | 12.5 |
| Ecosurf EH-14 | 90 | 14.2 |

| EH Blends | DI H2O | EH-3 | EH-6 | EH-9 | EH-14 | activity | HLB Blend | blend % wt (g). (in test soln) |
|---|---|---|---|---|---|---|---|---|
| 1 | 0 | 0.00 | 50.00 | 0.00 | 50.00 | 95.00 | 12.50 | 0.1052 |
| 2 | 0 | 0.00 | 33.33 | 33.34 | 33.33 | 97.67 | 12.50 | 0.1023 |
| 3 | 0 | 27.00 | 0.00 | 0.00 | 73.00 | 92.70 | 12.50 | 0.1078 |
| 4 | 0 | 21.35 | 0.00 | 21.35 | 57.30 | 94.27 | 12.49 | 0.1060 |
| 5 | 0 | 17.50 | 17.50 | 0.00 | 65.00 | 93.50 | 12.50 | 0.1069 |
| 6 | 0 | 0.00 | 0.00 | 100.00 | 0.00 | 100.00 | 12.50 | 0.1000 |
| 7 | 100 | 0.00 | 0.00 | 0.00 | 0.00 | n/a | 0.00 | n/a |
| 8 | 0 | 0.00 | 0.00 | 65.00 | 35.00 | 96.50 | 13.10 | 0.1036 |

Butter-Fat Removal Test 13

TABLE Q

| coupon | 10 min exposure time Product | Pdt. activity | total PPM actives in test solution | Clean coupon wt (g). | coupon/ soil wt (g) next day | soil wt (g) next day | post cleaning coupon/soil wt (g) after drying overnight | weight soil remains | % soil remains | % soil removed | % removed average |
|---|---|---|---|---|---|---|---|---|---|---|---|
| 1 | DI water pH 11.00 | n/a | n/a | 3.9589 | 3.9841 | 0.0252 | 3.9734 | 0.0145 | 57.54 | 42.5 | |
| 2 | DI water pH 11.00 | n/a | n/a | 3.9473 | 3.9735 | 0.0262 | 3.9611 | 0.0138 | 52.67 | 47.3 | |
| 3 | DI water pH 11.00 | n/a | n/a | 4.0284 | 4.0562 | 0.0278 | 4.0421 | 0.0137 | 49.28 | 50.7 | 46.8 |
| 4 | EH-9 + 10 ppm surfactin | 100% | 400 ppm EH-9 | 4.0508 | 4.0766 | 0.0258 | 4.0585 | 0.0077 | 29.84 | 70.2 | |
| 5 | EH-9 + 10 ppm surfactin | 100% | 400 ppm EH-9 | 4.0420 | 4.0693 | 0.0273 | 4.0482 | 0.0062 | 22.71 | 77.3 | |
| 6 | EH-9 + 10 ppm surfactin | 100% | 400 ppm EH-9 | 4.0244 | 4.0501 | 0.0257 | 4.0331 | 0.0087 | 33.85 | 66.1 | 71.2 |
| 7 | EH-9 + 10 ppm surfactin | 100% | 600 ppm EH-9 | 4.0545 | 4.0808 | 0.0263 | 4.0588 | 0.0043 | 16.35 | 83.7 | |

TABLE Q-continued

| coupon | Product | Pdt. activity | 10 min exposure time total PPM actives in test solution | Clean coupon wt (g). | coupon/ soil wt (g) next day | soil wt (g) next day | post cleaning coupon/soil wt (g) after drying overnight | weight soil remains | % soil remains | % soil removed | % removed average |
|---|---|---|---|---|---|---|---|---|---|---|---|
| 8 | EH-9 + 10 ppm surfactin | 100% | 600 ppm EH-9 | 3.9794 | 4.0059 | 0.0265 | 3.9861 | 0.0067 | 25.28 | 74.7 | |
| 9 | EH-9 + 10 ppm surfactin | 100% | 600 ppm EH-9 | 4.0137 | 4.0400 | 0.0263 | 4.0189 | 0.0052 | 19.77 | 80.2 | 79.5 |
| 10 | EH-9 + 10 ppm surfactin | 100% | 800 ppm EH-9 | 4.2678 | 4.2937 | 0.0259 | 4.2702 | 0.0024 | 9.27 | 90.7 | |
| 11 | EH-9 + 10 ppm surfactin | 100% | 800 ppm EH-9 | 4.0379 | 4.0640 | 0.0261 | 4.0415 | 0.0036 | 13.79 | 86.2 | |
| 12 | EH-9 + 10 ppm surfactin | 100% | 800 ppm EH-9 | 3.9546 | 3.9799 | 0.0253 | 3.9564 | 0.0018 | 7.11 | 92.9 | 89.9 |
| 16 | Ecosurf EH-9 | 100% | 400 ppm | 3.9474 | 3.9738 | 0.0264 | 3.9552 | 0.0078 | 29.55 | 70.5 | |
| 17 | Ecosurf EH-9 | 100% | 400 ppm | 4.0413 | 4.0682 | 0.0269 | 4.0492 | 0.0079 | 29.37 | 70.6 | |
| 18 | Ecosurf EH-9 | 100% | 400 ppm | 4.0087 | 4.0359 | 0.0272 | 4.0180 | 0.0093 | 34.19 | 65.8 | 69.0 |
| 19 | Ecosurf EH-9 | 100% | 600 ppm | 3.8929 | 3.9194 | 0.0265 | 3.8959 | 0.0030 | 11.32 | 88.7 | |
| 20 | Ecosurf EH-9 | 100% | 600 ppm | 3.9098 | 3.9366 | 0.0268 | 3.9139 | 0.0041 | 15.30 | 84.7 | |
| 21 | Ecosurf EH-9 | 100% | 600 ppm | 4.0168 | 4.0429 | 0.0261 | 4.0227 | 0.0059 | 22.61 | 77.4 | 83.6 |
| 22 | Ecosurf EH-9 | 100% | 800 ppm | 3.9649 | 3.9925 | 0.0276 | 3.9693 | 0.0044 | 15.94 | 84.1 | |
| 23 | Ecosurf EH-9 | 100% | 800 ppm | 4.0231 | 4.0496 | 0.0265 | 4.0242 | 0.0011 | 4.15 | 95.8 | |
| 24 | Ecosurf EH-9 | 100% | 800 ppm | 4.0316 | 4.0591 | 0.0275 | 4.0357 | 0.0041 | 14.91 | 85.1 | 88.3 |
| 13 | Ecosurf EH-9 | 100% | 1000 ppm | 3.9662 | 3.9919 | 0.0257 | 3.9663 | 1E−04 | 0.39 | 99.6 | |
| 14 | Ecosurf EH-9 | 100% | 1000 ppm | 4.0391 | 4.0666 | 0.0275 | 4.0405 | 0.0014 | 5.09 | 94.9 | |
| 15 | Ecosurf EH-9 | 100% | 1000 ppm | 4.0280 | 4.0552 | 0.0272 | 4.0309 | 0.0029 | 10.66 | 89.3 | 94.6 |
| 25 | NPE-9.5 | 100% | 500 ppm | 3.9625 | 3.9888 | 0.0263 | 3.9620 | −0.0005 | −1.90 | 101.9 | |
| 26 | NPE-9.5 | 100% | 500 ppm | 4.0835 | 4.1116 | 0.0281 | 4.0833 | −0.0002 | −0.71 | 100.7 | |
| 27 | NPE-9.5 | 100% | 500 ppm | 3.9390 | 3.9662 | 0.0272 | 3.9384 | −0.0006 | −2.21 | 102.2 | 101.6 | comments,
The test solutions containing 10 ppm surfactant were prepared by
adding 6 grams of a 0.1% surfactin solution (prepared in DI) to 594 grams test solution.
(test solution contains surfactant and DI water)

Butterfat Removal Test 14 Table R

TABLE R

| coupon | Product | Pdt. activity | total PPM actives in test solution | Clean coupon wt (g). | coupon/ soil wt (g) next day | soil wt (g) next day | post cleaning coupon/ soil wt (g) after drying overnight | weight soil remains | % soil remains | % soil removed | % removed average |
|---|---|---|---|---|---|---|---|---|---|---|---|
| 1 | DI water pH 11.00 | n/a | n/a | 4.0169 | 4.0421 | 0.0252 | 4.0340 | 0.0171 | 67.86 | 32.1 | |
| 2 | DI water pH 11.00 | n/a | n/a | 3.9788 | 4.0062 | 0.0274 | 3.9958 | 0.017 | 62.04 | 38.0 | |
| 3 | DI water pH 11.00 | n/a | n/a | 3.9356 | 3.9621 | 0.0265 | 3.9517 | 0.0161 | 60.75 | 39.2 | 36.4 |
| 4 | DI water pH 10.00 | n/a | n/a | 4.0309 | 4.0582 | 0.0273 | 4.0498 | 0.0189 | 69.23 | 30.8 | |
| 5 | DI water pH 10.00 | n/a | n/a | 3.9462 | 3.9748 | 0.0286 | 3.9643 | 0.0181 | 63.29 | 36.7 | |
| 6 | DI water pH 10.00 | n/a | n/a | 3.9565 | 3.9843 | 0.0278 | 3.9742 | 0.0177 | 63.67 | 36.3 | 34.6 |
| 7 | DI water pH 9.00 | n/a | n/a | 4.0162 | 4.0434 | 0.0272 | 4.0336 | 0.0174 | 63.97 | 36.0 | |
| 8 | DI water pH 9.00 | n/a | n/a | 4.0149 | 4.0422 | 0.0273 | 4.0345 | 0.0196 | 71.79 | 28.2 | |

TABLE R-continued

| coupon | Product | Pdt. activity | total PPM actives in test solution | Clean coupon wt (g). | coupon/soil wt (g) next day | soil wt (g) next day | post cleaning coupon/soil wt (g) after drying overnight | weight soil remains | % soil remains | % soil removed | % removed average |
|---|---|---|---|---|---|---|---|---|---|---|---|
| 9 | DI water pH 9.00 | n/a | n/a | 3.9682 | 3.9963 | 0.0281 | 3.9873 | 0.0191 | 67.97 | 32.0 | 32.1 |
| 10 | EH-9 pH 11.00 | 100% | 1000 ppm | 4.0664 | 4.0945 | 0.0281 | 4.0697 | 0.0033 | 11.74 | 88.3 | |
| 11 | EH-9 pH 11.00 | 100% | 1000 ppm | 4.0112 | 4.0400 | 0.0288 | 4.0177 | 0.0065 | 22.57 | 77.4 | |
| 12 | EH-9 pH 11.00 | 100% | 1000 ppm | 4.0300 | 4.0586 | 0.0286 | 4.0345 | 0.0045 | 15.73 | 84.3 | 83.3 |
| 13 | EH-9 pH 10.00 | 100% | 1000 ppm | 3.9566 | 3.9835 | 0.0269 | 3.9616 | 0.005 | 18.59 | 81.4 | |
| 14 | EH-9 pH 10.00 | 100% | 1000 ppm | 3.9016 | 3.9299 | 0.0283 | 3.9070 | 0.0054 | 19.08 | 80.9 | |
| 15 | EH-9 pH 10.00 | 100% | 1000 ppm | 3.9880 | 4.0154 | 0.0274 | 3.9924 | 0.0044 | 16.06 | 83.9 | 82.1 |
| 16 | EH-9 pH 9.00 | 100% | 1000 ppm | 3.9064 | 3.9346 | 0.0282 | 3.9124 | 0.0060 | 21.28 | 78.7 | |
| 17 | EH-9 pH 9.00 | 100% | 1000 ppm | 3.8736 | 3.9012 | 0.0276 | 3.8804 | 0.0068 | 24.64 | 75.4 | |
| 18 | EH-9 pH 9.00 | 100% | 1000 ppm | 4.0068 | 4.0351 | 0.0283 | 4.0152 | 0.0084 | 29.68 | 70.3 | 74.8 |
| 19 | NPE-9.5 pH 11.00 | 100% | 500 ppm | 4.0196 | 4.0476 | 0.0280 | 4.0230 | 0.0034 | 12.14 | 87.9 | |
| 20 | NPE-9.5 pH 11.00 | 100% | 500 ppm | 4.2305 | 4.2577 | 0.0272 | 4.2322 | 0.0017 | 6.25 | 93.8 | |
| 21 | NPE-9.5 pH 11.00 | 100% | 500 ppm | 3.9203 | 3.9483 | 0.0280 | 3.9228 | 0.0025 | 8.93 | 91.1 | 90.9 |
| 22 | *No Gel EH-9 pH 11.0 | 95% | 1000 ppm | 3.9367 | 3.9654 | 0.0287 | 3.9412 | 0.0045 | 15.68 | 84.3 | |
| 23 | *No Gel EH-9 pH 11.0 | 95% | 1000 ppm | 3.8987 | 3.9274 | 0.0287 | 3.9034 | 0.0047 | 16.38 | 83.6 | |
| 24 | *No Gel EH-9 pH 11.0 | 95% | 1000 ppm | 4.1928 | 4.2221 | 0.0293 | 4.1982 | 0.0054 | 18.43 | 81.6 | 83.2 |

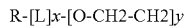
*Caleb Power formula

A summary of the butterfat removal tests is shown in FIG. 11.

Various modifications and additions can be made to the exemplary embodiments discussed without departing from the scope of the present disclosure. For example, while the embodiments described above refer to particular features, this also includes embodiments having different combinations of features and embodiments that do not include all of the described features. Accordingly, the scope of the disclosure is intended to embrace all such alternatives, modifications, and variations as fall within the scope of the claims, together with all equivalents thereof.

What is claimed is:

1. A method of cleaning a filtration membrane comprising:
    applying to said membrane a cleaning composition comprising;
        a source of alkalinity; and
        one or more branched extended nonionic surfactants with a contact angle of less than 20 degrees, a cloud point of 50° C. or higher, wherein said branched extended nonionic surfactant has the following formula:

R-[L]x-[O-CH2-CH2]y where R is 2 ethyl hexyl, L is a propylene oxide (PO) linking group, x is the chain length of the linking group ranging from 2-25, and y is the average degree of ethoxylation ranging from 2 to 20; and thereafter
    rinsing said membrane, wherein said cleaning composition is nonyl phenol ethoxylate (NPE) free.

2. The method according to claim 1 wherein said y is 6 or 9.

3. The method according to claim 1 wherein said cleaning composition further comprises a Guerbet alcohol.

4. The method according to any of claim 3 wherein said Guerbet alcohol is a 3 propyl heptanol C10-(PO)a(EO)b series, where a is 1.0 to 1.5, and b is 4 to 14.

5. The method according to claim 1 wherein said membrane is a polyethersulfone membrane.

6. The method according to claim 1 wherein said membrane is a polyvinylidene fluoride membrane.

7. The method according to claim 1 wherein said membrane is a polyvinylidene fluoride membrane.

8. The method according to claim 1 wherein said membrane is a polyamide and/or thin film composite membrane.

9. The method according to claim 1 wherein said membrane is a ceramic membrane.

10. The method according to claim 1 wherein said membrane is a stainless steel membrane.

11. The method according to claim 1 wherein said cleaning composition has an interfacial tension of less than 7 mN/m.

* * * * *